(12) United States Patent
Yang et al.

(10) Patent No.: US 12,489,158 B2
(45) Date of Patent: Dec. 2, 2025

(54) LIGHTWEIGHT AND HIGH-IMPACT-RESISTANT ELECTRIC VEHICLE BATTERY ENCLOSURE WITH FIBER METAL LAMINATE COMPOSITES

(71) Applicant: The Hong Kong University of Science and Technology, Hong Kong (CN)

(72) Inventors: Jinglei Yang, Hong Kong (CN); Logesh Shanmugam, Hong Kong (CN); Cheng Qiu, Hong Kong (CN); MohammadErfan Kazemi, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 964 days.

(21) Appl. No.: 17/577,007

(22) Filed: Jan. 16, 2022

(65) Prior Publication Data

US 2022/0231361 A1    Jul. 21, 2022

Related U.S. Application Data

(60) Provisional application No. 63/194,195, filed on May 28, 2021, provisional application No. 63/138,514, filed on Jan. 17, 2021.

(51) Int. Cl.
*H01M 50/242*    (2021.01)
*H01M 50/119*    (2021.01)
(Continued)

(52) U.S. Cl.
CPC ....... *H01M 50/131* (2021.01); *H01M 50/119* (2021.01); *H01M 50/143* (2021.01); *H01M 50/145* (2021.01)

(58) Field of Classification Search
None
See application file for complete search history.

(56) References Cited

U.S. PATENT DOCUMENTS

| 4,037,011 A | 7/1977 | Hattori et al. |
| 5,238,638 A | 8/1993 | Isayev |

(Continued)

FOREIGN PATENT DOCUMENTS

| CN | 104173196 A | 12/2014 | |
| CN | 106898711 | * 6/2017 | ............. H01M 2/02 |

(Continued)

OTHER PUBLICATIONS

English translation of JP 2012/109452 (Year: 2012).*

(Continued)

*Primary Examiner* — Yoshitoshi Takeuchi
(74) *Attorney, Agent, or Firm* — Idea Intellectual Limited; Sam T. Yip

(57) ABSTRACT

A method is provided for fabricating thermoplastic fiber-reinforced polymer material (FRP) and fiber metal laminate (FML) composites by a resin-infusion process with a liquid thermoplastic poly methyl methacrylate (PMMA) resin, which has a mixed viscosity of 200 cP at room temperature. The curing process may be initiated by benzoyl peroxide in the methyl methacrylate matrix, which follows a radical polymerization process. A high impact resistance lightweight battery enclosure may be formed by a composite of ductile metal (aluminum alloy, magnesium alloy, titanium alloy, or steel alloy) with fiber-reinforced polymers (FRP). The fiber material in the FRP can be carbon fiber, glass fiber, basalt fiber, Kevlar fiber, UHMWPE fiber, or any combination thereof.

7 Claims, 34 Drawing Sheets

(51) Int. Cl.
*H01M 50/131* (2021.01)
*H01M 50/143* (2021.01)
*H01M 50/145* (2021.01)
*H01M 50/224* (2021.01)
*H01M 50/227* (2021.01)
*H01M 50/229* (2021.01)
*H01M 50/231* (2021.01)

(56) References Cited

U.S. PATENT DOCUMENTS

| | | | |
|---|---|---|---|
| 9,331,321 | B2 | 5/2016 | Berger et al. |
| 9,493,612 | B2 | 11/2016 | Block et al. |
| 2009/0022975 | A1 | 1/2009 | Hales et al. |
| 2009/0306253 | A1 | 12/2009 | Hansen et al. |
| 2011/0052910 | A1 | 3/2011 | Gunnink et al. |
| 2012/0103714 | A1 | 5/2012 | Choi et al. |
| 2017/0283565 | A1* | 10/2017 | Ono ................. H01G 11/52 |
| 2018/0040912 | A1* | 2/2018 | Chang ............. H01M 50/126 |
| 2019/0263342 | A1* | 8/2019 | Rodgers ............ B60R 19/18 |
| 2019/0348725 | A1 | 11/2019 | Golubkov |
| 2020/0152926 | A1* | 5/2020 | Wynn .................. B32B 15/14 |
| 2021/0402861 | A1* | 12/2021 | Aitharaju ............. B60L 50/64 |
| 2022/0181714 | A1* | 6/2022 | Boddakayala ...... H01M 10/625 |
| 2022/0416343 | A1* | 12/2022 | He ..................... H01M 50/282 |
| 2024/0154228 | A1* | 5/2024 | Yildiz ................. H01M 50/24 |

FOREIGN PATENT DOCUMENTS

| | | | | |
|---|---|---|---|---|
| CN | 109301124 | A | | 2/2019 |
| DE | 102016207320 | A1 | | 11/2017 |
| DE | 102017211372 | A1 | | 1/2019 |
| EP | 0156599 | A1 | | 10/1985 |
| EP | 0217563 | A2 | | 4/1987 |
| JP | 2003007256 | A | | 1/2003 |
| JP | 2012/109452 | | * 6/2012 | ............ B32B 15/08 |
| KR | 102253108 | B1 | | 5/2021 |
| WO | 2012034788 | A1 | | 3/2012 |

OTHER PUBLICATIONS

English translation of CN 106898711 (Year: 2017).*
K. Kavitha et al., Fibre-metal laminates: A review of reinforcement and formability characteristics, Materials Today Proceedings, vol. 22, Part 3, 2020, pp. 601-605.
Dimitrios Mamalis et al., Novel thermoplastic fibre-metal laminates manufactured by vacuum resin infusion: The effect of surface treatments on interfacial bonding, Materials & Design, vol. 162, 2019, pp. 331-344.
Somen K. Bhudolia et al., Mode I fracture toughness and fractographic investigation of carbon fibre composites with liquid Methylmethacrylate thermoplastic matrix, Composites Part B: Engineering, vol. 134, 2018, pp. 246-253.
T. Pini et al., Fracture initiation and propagation in unidirectional CF composites based on thermoplastic acrylic resins, Engineering Fracture Mechanics, vol. 184, 2017, pp. 51-58.
Teresa Nirmala et al., Design Study of Battery System Protection Structure Based on Hybrid Material Fiber Metal Laminate (FML), 2019 6th International Conference on Electric Vehicular Technology (ICEVT), 2019, pp. 163-169.
Grace Nehls, Manna Laminates FEATURE organosheet laminate targets EMS applications, CompositesWorld, 2021, retrieved from https://www.compositesworld.com/products/manna-laminates-feature-organosheet-laminate-targets-ems-applications.
Changcheng Liu et al., Phase Change Materials Application in Battery Thermal Management System: A Review, Materials, 2020, 13(20):4622.
M.E. Kazemi et al., Novel Thermoplastic Fiber Metal Laminates Manufactured With An Innovative Acrylic Resin At Room Temperature, Composites Part A: Applied Science and Manufacturing, vol. 138, 2020, 106043.
M.E. Kazemi et al., Low-velocity impact behaviors of a fully thermoplastic composite laminate fabricated with an innovative acrylic resin, Composites Structures, vol. 250, 2020, 112604.
M.E. Kazemi et al., Mechanical Properties and Failure Modes of Hybrid Fiber Reinforced Polymer Composites with a Novel Liquid Thermoplastic Resin, Elium®, Composites Part A: Applied Science and Manufacturing, vol. 125, 2019, 105523.
Qiu-Sheng Chen et al., Research on Battery Box Lightweight Based on Material Replacement, 2017 5th International Conference on Mechatronics, Materials, Chemistry and Computer Engineering (ICMMCCE 2017), Advances in Engineering Research, vol. 141, 2017.
Matthias Hartmann et al., Enhanced Battery Pack for Electric Vehicle: Noise Reduction and Increased Stiffness, Materials Science Forum, vol. 765, 2013.

* cited by examiner

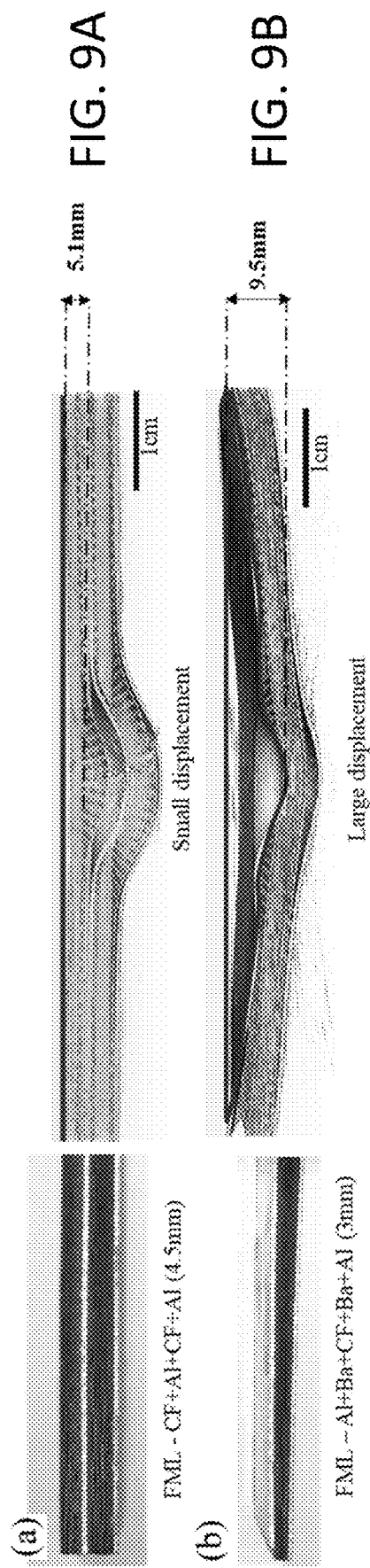

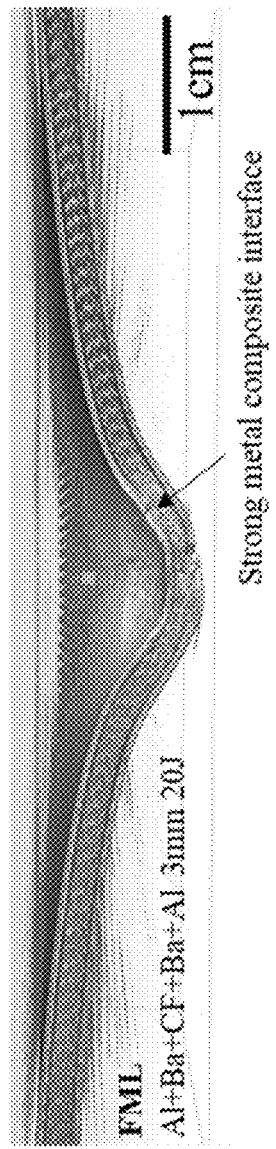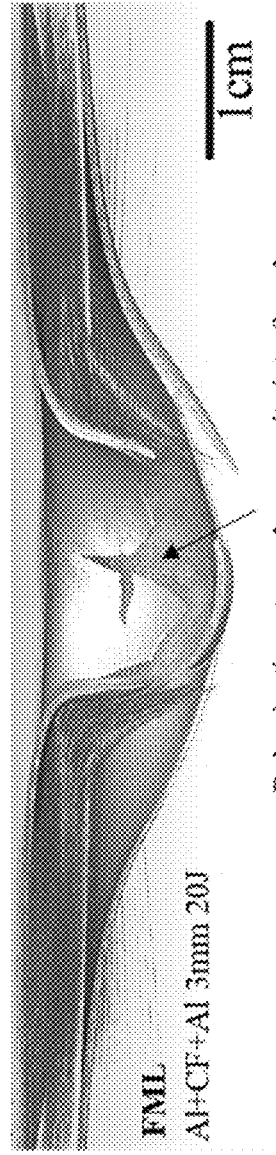
FIG. 12A
FIG. 12B

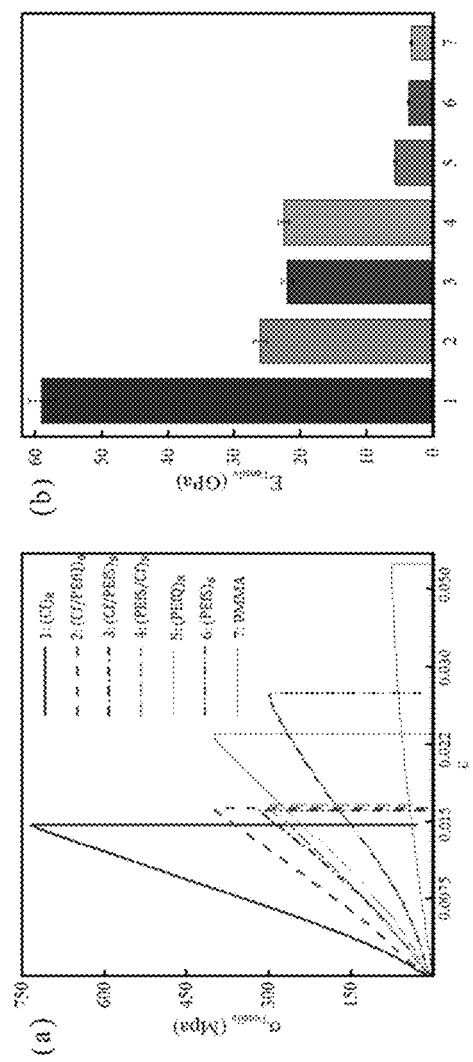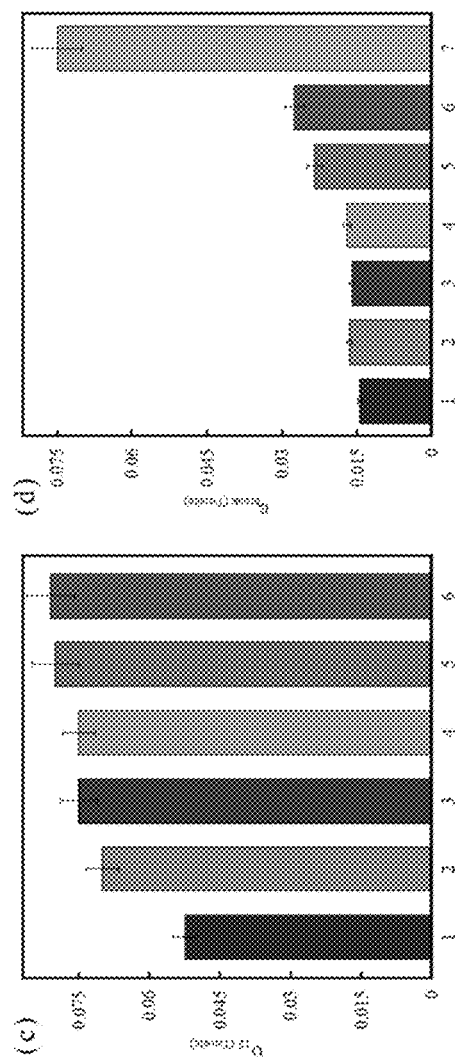
FIG. 14A  FIG. 14B  FIG. 14C  FIG. 14D

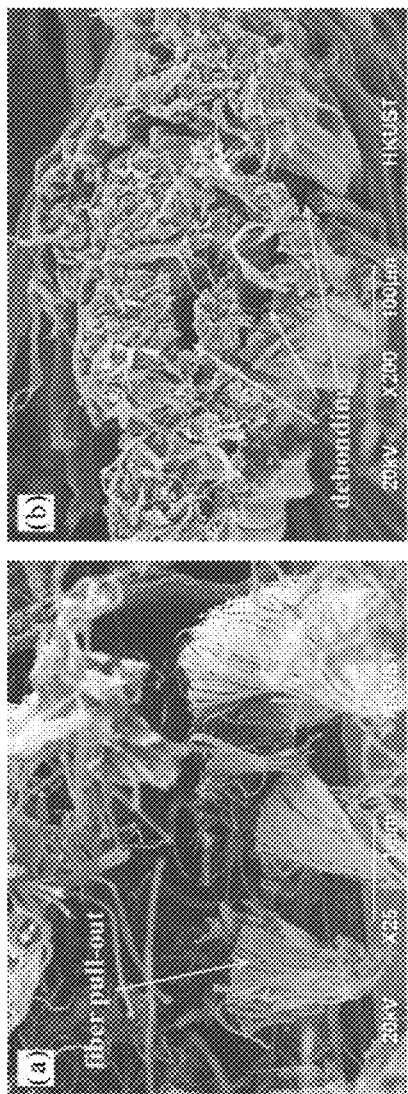
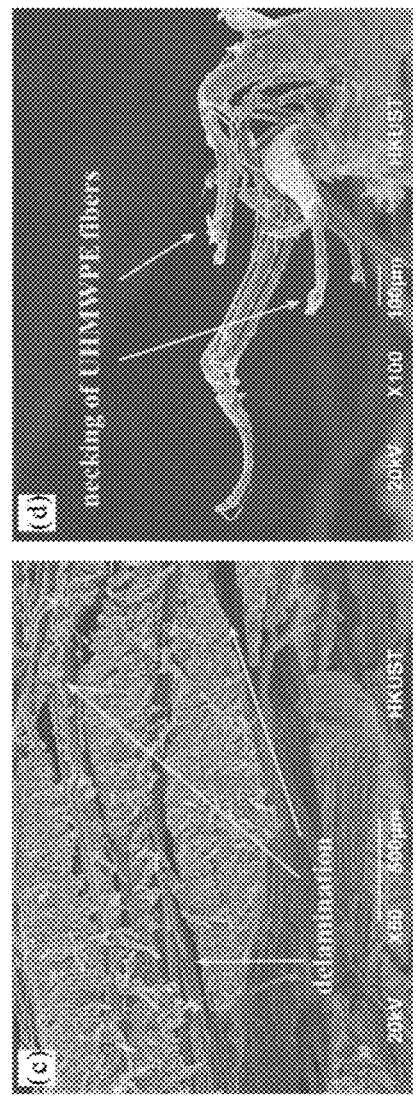
FIG. 16B
FIG. 16D
FIG. 16A
FIG. 16C

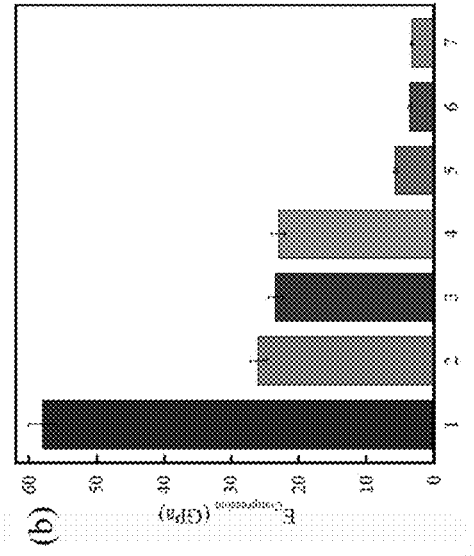
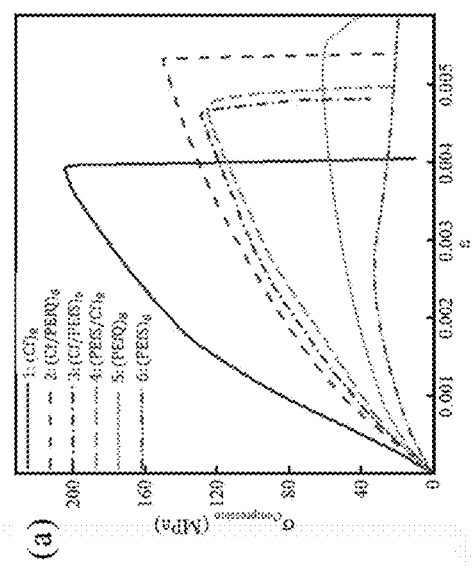
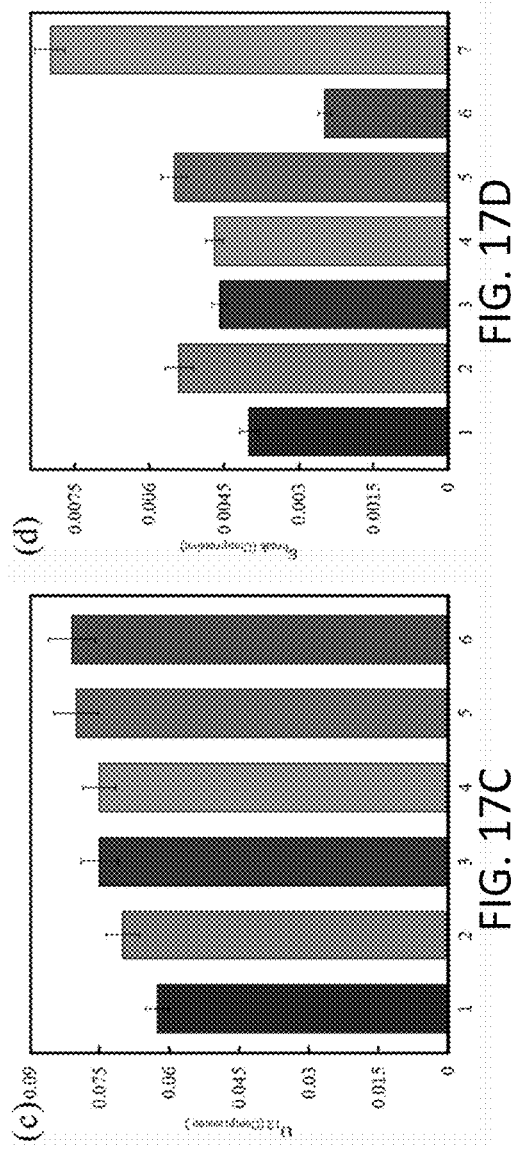
FIG. 17A
FIG. 17B
FIG. 17C
FIG. 17D

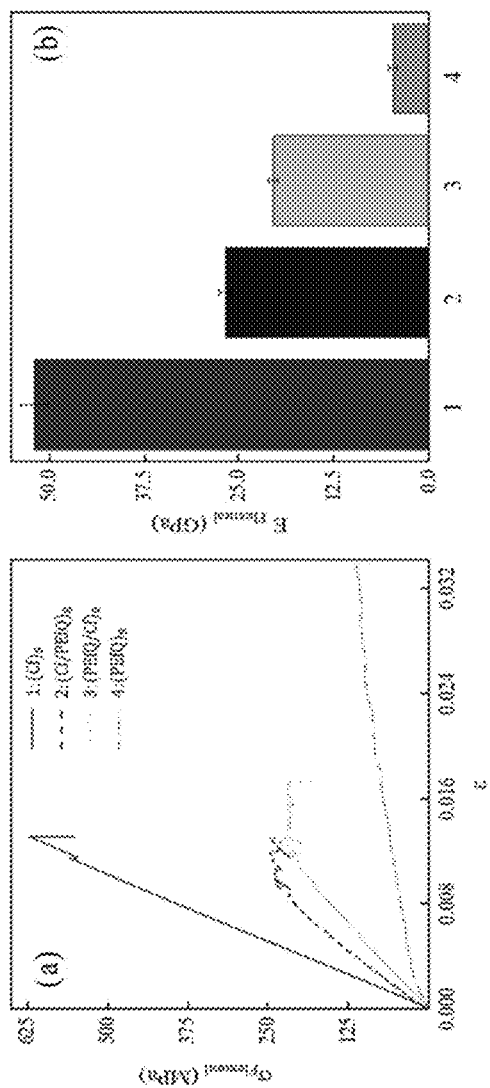
FIG. 19A
FIG. 19B
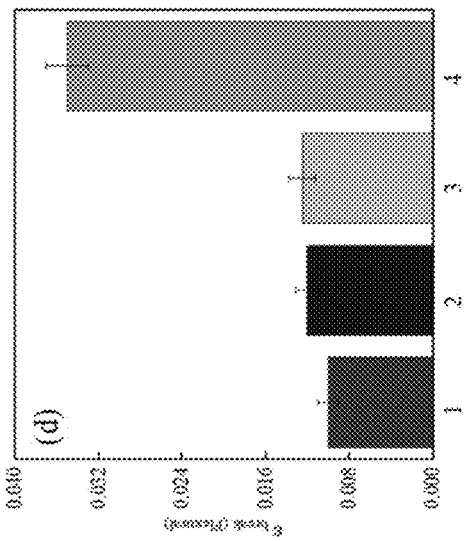
FIG. 19C
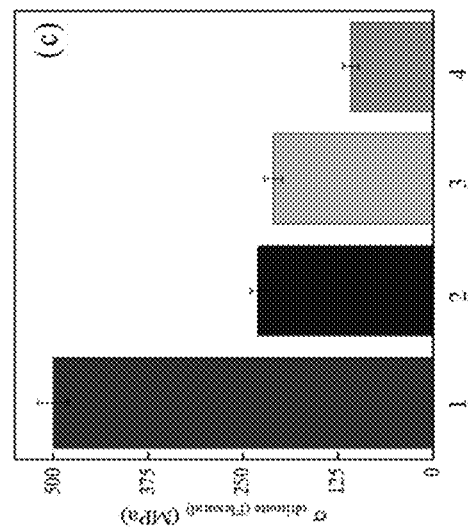
FIG. 19D

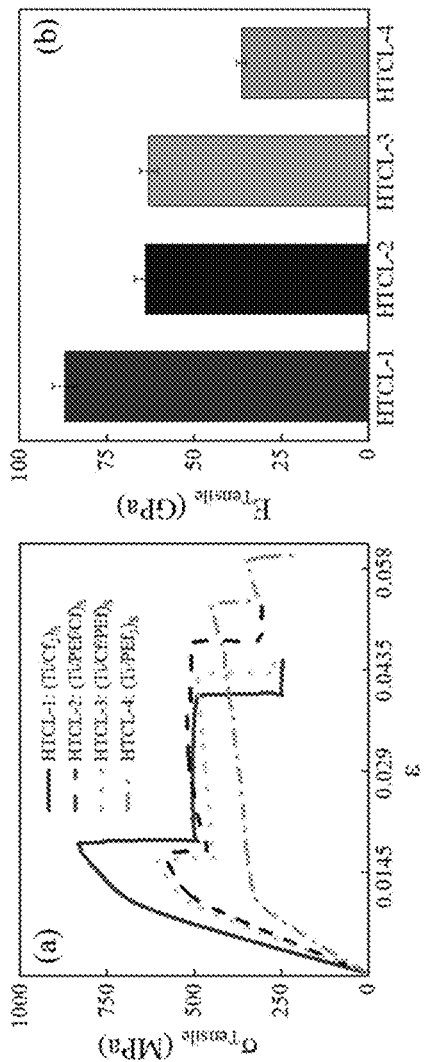
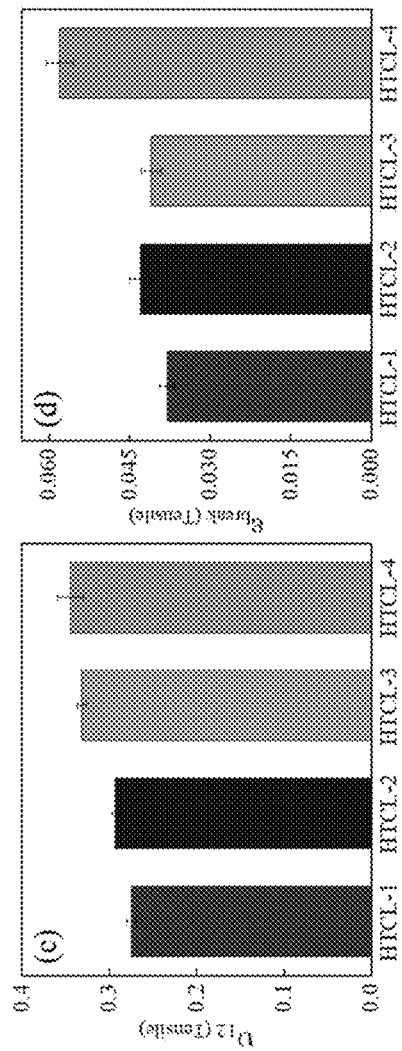
FIG. 20A
FIG. 20B
FIG. 20C
FIG. 20D

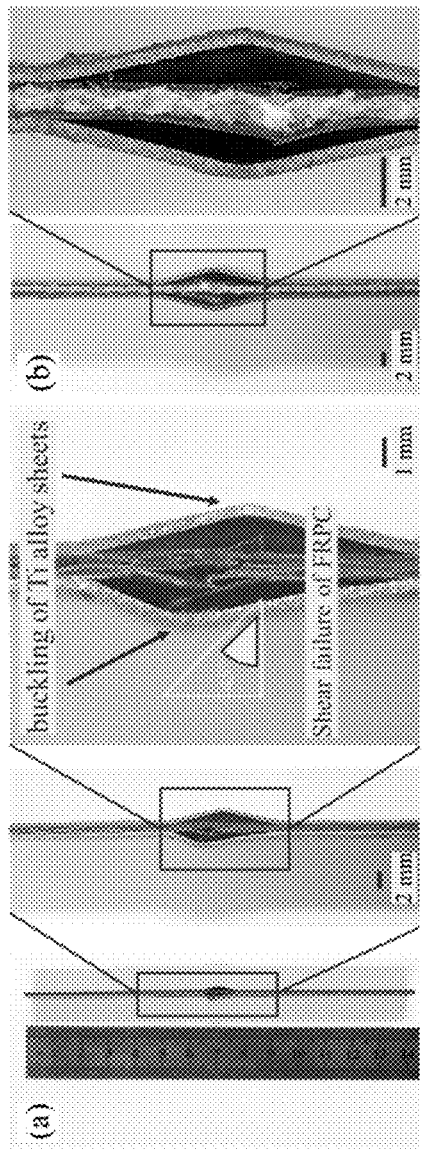
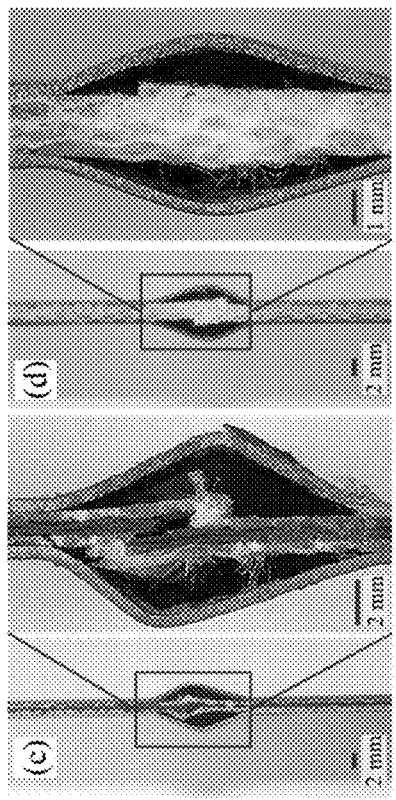
FIG. 22A  FIG. 22B  FIG. 22C  FIG. 22D

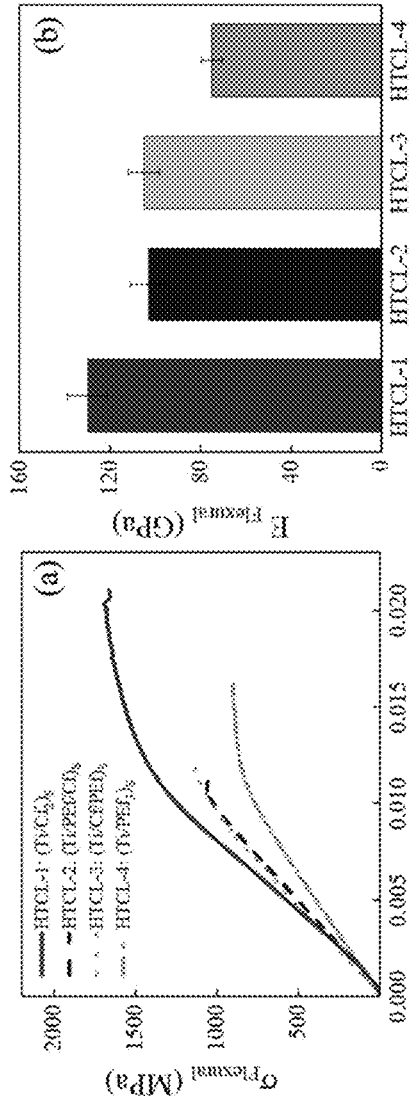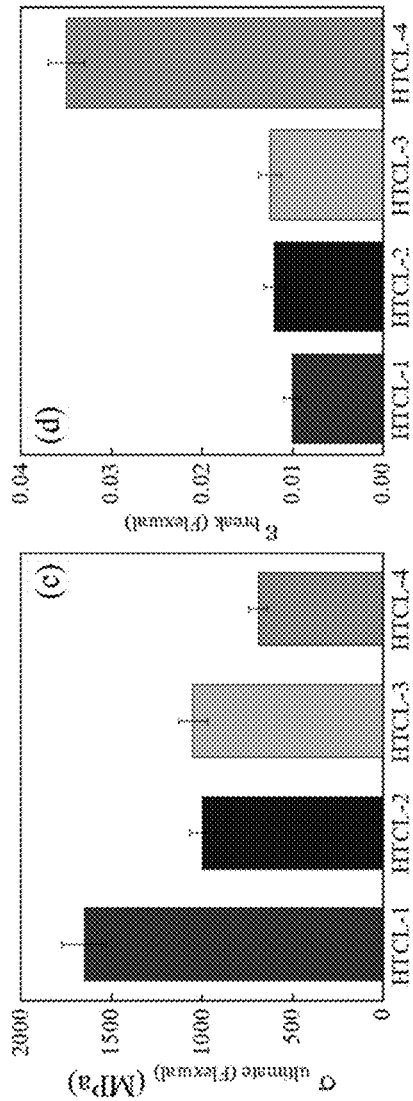
FIG. 24A  FIG. 24B  FIG. 24C  FIG. 24D

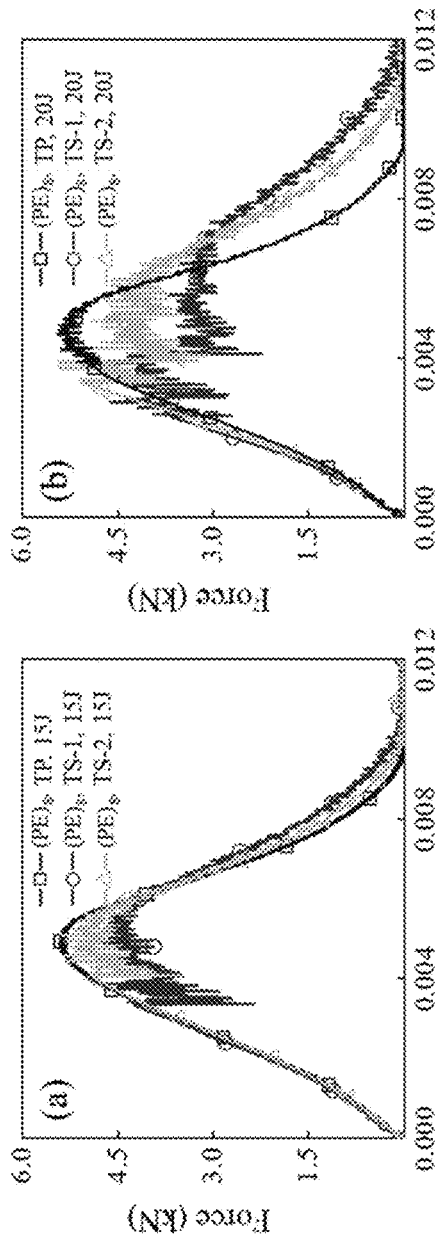
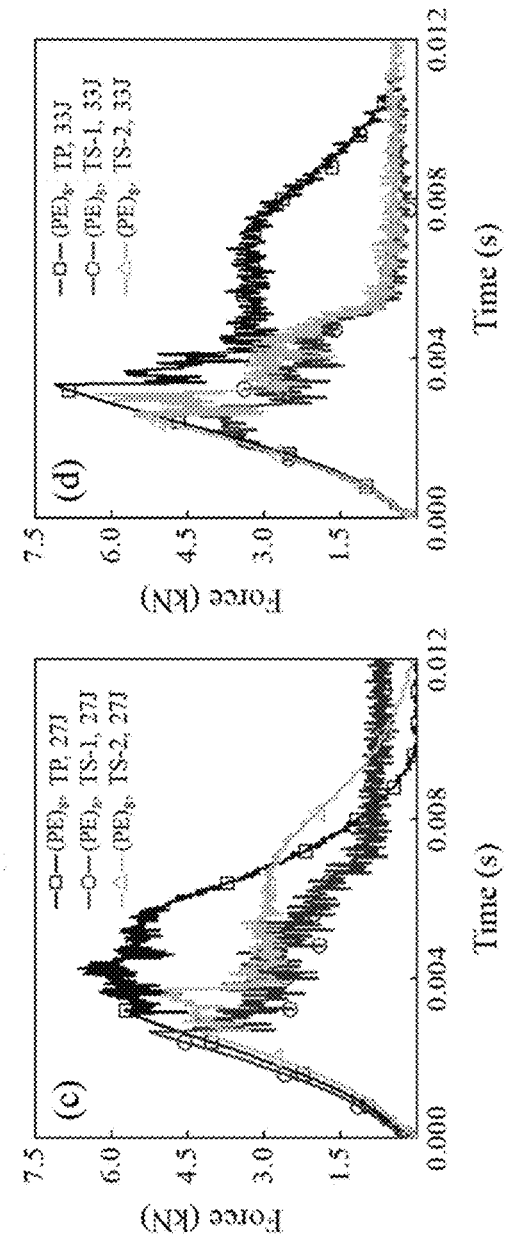
FIG. 25A
FIG. 25B
FIG. 25C
FIG. 25D

LIGHTWEIGHT AND HIGH-IMPACT-RESISTANT ELECTRIC VEHICLE BATTERY ENCLOSURE WITH FIBER METAL LAMINATE COMPOSITES

CROSS-REFERENCE TO RELATED APPLICATIONS

The present application claims priority to U.S. Provisional Applications 63/138,514 filed 17 Jan. 2021 and 63/194,195 filed 28 May 2021, the disclosures of which are incorporated by reference herein.

FIELD OF THE INVENTION

The present invention generally relates to fabricating fiber metal laminate composites, and in particular, to utilizing those materials in electric vehicle battery enclosures.

BACKGROUND OF THE INVENTION

Though electric vehicles (EVs) hold great promise to reduce vehicle emissions compared to conventional gas-powered cars, EVs generally do not have the same range traveling on a full battery charge as a gas-powered car can travel on a full tank of gas. To achieve the same travel range and endurance, a large energy storage unit can be installed within the EV's battery pack. However, adding a larger energy storage unit detrimentally increases the EV's weight, which in turn impacts performance by causing excessive driving resistance and worsening the EV's energy demand.

One way to compensate for increased battery weight is to decrease the battery housing's weight by forming it from very lightweight materials. Yet the lightweight material to be used must offer other qualities as well: high-impact resistance, fire safety, vibration damping, high thermal conductivity, Ingress Protection 67 (IP67) properties for dust protection and water resistance, electromagnetic interference (EMI) shielding, and anti-corrosion properties.

As such, common materials for making EV battery enclosures are insufficient. Steel is too heavy, and aluminum is light enough but does not meet requirements for fire protection, EMI shielding, etc. Thermoset fiber-reinforced polymer composites and fiber metal laminates are more suitable, as they are lightweight and offer fire protection, EMI shielding, etc., but they are brittle, delaminating in an impact due to out-of-plane stress and transverse shear. Thermoplastic matrix-based composites reduce such delamination and offer a high energy absorbing capability during impact. However, because of the solid state of thermoplastic at room temperature, thermoplastic-based composites can only be fabricated by hot-pressing technique.

Thus, there is a need for improved lightweight battery enclosures, which the present invention addresses.

SUMMARY OF THE INVENTION

In accordance with one aspect of the present invention, a method is provided for fabricating thermoplastic fiber-reinforced polymer material (FRP) and fiber metal laminate (FML) composites by a resin-infusion process with a liquid thermoplastic poly methyl methacrylate (PMMA) resin, which has a mixed viscosity of 200 cP at room temperature. The curing process is initiated by benzoyl peroxide in the methyl methacrylate matrix, which follows a radical polymerization process. For the resin infusion fabrication of PMMA-based thermoplastic FML, the reinforcement fabric is extended outside the metal plate to guide the flow of resin. FRP and FML fabricated by this thermoplastic resin infusion process have greater impact resistance compared to that of any FRP and FML fabricated by a thermosetting resin infusion process. The exemplary thermoplastic FRP composites are based on carbon fiber, ultra-high-molecular-weight polyethylene (UHMWPE) fiber, and the combination of both along with the PMMA resin/matrix. Similarly, the exemplary thermoplastic FML composites are based on a titanium metal alloy, reinforced by carbon fiber, UHMWPE fiber, and the combination of both along with the PMMA resin.

The above invention may be used to address the problem of high impact resistance lightweight battery enclosures. This fiber manufacturing technique yields a suitable material that has higher impact resistance than carbon FRP by minimizing the maximum deformation, lower density than steel and aluminum alloys, enhanced IP67 protection, improved electromagnetic interference shielding to protect the battery pack's electronic components, improved vibration damping, and high in-plane thermal conductivity to dissipate heat. The sandwich combination of ductile metal (aluminum alloy, magnesium alloy, titanium alloy, or steel alloy) with the FRP leads to a formation of FML, a hybrid composite material. The fiber material in the FRP can be carbon fiber, glass fiber, basalt fiber, Kevlar fiber, UHMWPE fiber, or any combination thereof. The fibers are used in the form of fabrics with different weaving patterns and are combined with either thermoplastic or thermosetting resin to form an FRP. The fabrication process of FML is either by vacuum-assisted resin infusion, vacuum-assisted resin transfer molding, or hot-pressing technique. Curing the resin in the FRP system can be in an autoclave, out-of-autoclave, or compression-molding process. The fibers and resin are separately used in the FML/FRP fabrication or used in the form of pre-impregnated resin. The ductile metal used to fabricate the FML is surface modified to enhance the surface functionality so it becomes oleophilic to attract the matrix material from the FRP. The surface modification leads to strong metal and composite interface. Enhancing this interface avoids the delamination between the metal layer and the FRP composites while improving impact resistance.

In a further aspect, the impact-resistant, lightweight, EMI-shielding electric vehicle battery enclosure housing may include an interior void and the interior void includes an energy-absorbing or heat-absorbing material positioned therein.

In a further aspect, the impact-resistant, lightweight, EMI-shielding electric vehicle battery enclosure housing may include an interior void including a heat-absorbing material comprising a phase-change material.

In a further aspect, the impact-resistant, lightweight, EMI-shielding electric vehicle battery enclosure housing multiple-layer fiber-metal laminate may further include a layer of impact-absorbing foam selected from one or more of polyurethane, polystyrene, polypropylene, polyvinyl chloride, or polyethylene.

In a further aspect, the impact-resistant, lightweight, EMI-shielding electric vehicle battery enclosure fiber-reinforced polymer composite layer may include a polymer additive selected from one or more of milled carbon fiber, carbon nanotubes, metal or non-metal particles, or a microencapsulated phase change material.

In a further aspect, the impact-resistant, lightweight, EMI-shielding electric vehicle battery enclosure housing may include reinforcing ribs.

BRIEF DESCRIPTION OF THE DRAWINGS

Embodiments of the invention are described in more details hereinafter with reference to the drawings, in which:

FIG. 8A shows absorbed energy vs time curves showing energy absorption by laminates. FIG. 8B shows load vs time. FIG. 8C are load-displacement curves showing deformation after an impact.

FIGS. 9A-9B show cross-sectional images of fiber metal laminate composites after 40 J of impact energy (a) FML-CF+Al+CF+Al (b) FML-Al+Ba+CF+Ba+Al.

FIG. 10A shows absorbed energy vs time curves showing energy absorption by laminates FIG. 10B shows load vs time.

FIG. 11A is Carbon FRP impact at 20 J (perforation) FIG. 11B is Basalt FRP impact at 20 J (perforation).

FIGS. 12A-12B show cross-sectional images of fiber metal laminate composites after 20 J of impact energy. FIG. 12A is FML-Al+Ba+CF+Ba+Al impact at 20 J (penetration) and FIG. 12B is FML-Al+CF+Al impact at 20 J (penetration).

FIG. 13A: Basalt FRP impact at 20 J (perforation); FIG. 13B: Carbon FRP impact at 20 J (perforation); FIG. 13C: FML-Al+CF+Al impact at 20 J (penetration); FIG. 13D: FML-Al+Ba+Al impact at 20 J (penetration); FIG. 13E: FML-Ba+CF+Al impact at 20 J (penetration); FIG. 13F: FML-Al+Ba+CF+Ba+Al impact at 20 J (penetration); FIG. 13G: FML-CF+Al+CF+Al impact at 20 J (penetration); FIG. 13H: FML-CF+Al+CF+Al impact at 40 J (penetration).

FIG. 14A-14D show the tensile properties of thermoplastic FRP composites: FIG. 14A stress-strain, FIG. 14B Young's modulus, FIG. 14C Poisson's ratios, and FIG. 14D ultimate strains.

FIG. 15A warp and weft failures, FIG. 15B failure of a single weft fiber bundle, FIG. 15C fiber pull-out, and FIG. 15D fiber breakage surface.

FIGS. 16A-16D show the fracture images from the thermoplastic UHMWPE fiber-based FRP: FIG. 16A weft fiber pull-out, FIG. 16B debonding (among) and fiber pull-out, FIG. 16C delamination between weft and warp fibers, and FIG. 16D necking of UHMWPE fiber.

FIGS. 17A-17D show the compressive properties of thermoplastic FRP: FIG. 17A stress-strain curve, FIG. 17B Young's modulus, FIG. 17C Poisson's ratios, and FIG. 17D ultimate strains.

FIG. 18A is a stress-strain curve, FIG. 18B is intralaminar, FIG. 18C is interlaminar.

FIGS. 19A-19D are the flexural properties of thermoplastic FRP: FIG. 19A is a stress-strain curve, FIG. 19B are flexural moduli, FIG. 19C are the ultimate flexural strengths, and FIG. 19D are the ultimate flexural strains.

FIGS. 20A-20D are the tensile properties of thermoplastic FML: FIG. 20A shows tensile stress-strain curves, FIG. 20B are elastic moduli, FIG. 20C are Poisson's ratios, and FIG. 20D shows ultimate strains.

FIG. 21A shows the stress-strain curves, FIG. 21B is the modulus, FIG. 21C shows Poisson's ratios, and FIG. 21D shows ultimate strains.

FIGS. 22A-22D show the compressive failure mode of thermoplastic FML: FIG. 22A shows failure of HTCL-1, FIG. 22B shows failure of HTCL-2, FIG. 22C shows failure of HTCL-3, and FIG. 22D shows failure of HTCL-4.

FIG. 23A is the in-plane shear stress-strain curve, FIG. 23B is the in-plane shear strength and modulus; FIG. 23C is the out-of-plane shear properties.

FIG. 24A-24D are the flexural properties of thermoplastic FML: FIG. 24A is stress-strain, FIG. 24B is the modulus, FIG. 24C is the ultimate strengths, and FIG. 24D is the ultimate strains.

FIGS. 25A-25D is the force-time plot of both thermosetting and thermoplastic FRP composites impact at a different impact energy: FIG. 25A 15 J, FIG. 25B 20 J, FIG. 25C 27 J, and FIG. 25D 33 J.

FIG. 28A HTCL-1E, FIG. 28B HTCL-2E, FIG. 28C HTCL-3E, and FIG. 28D HTCL-4E.

DETAILED DESCRIPTION

In the following description, a method and system for manufacturing an electric vehicle (EV) battery enclosure from a fiber-metal laminate are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 3:
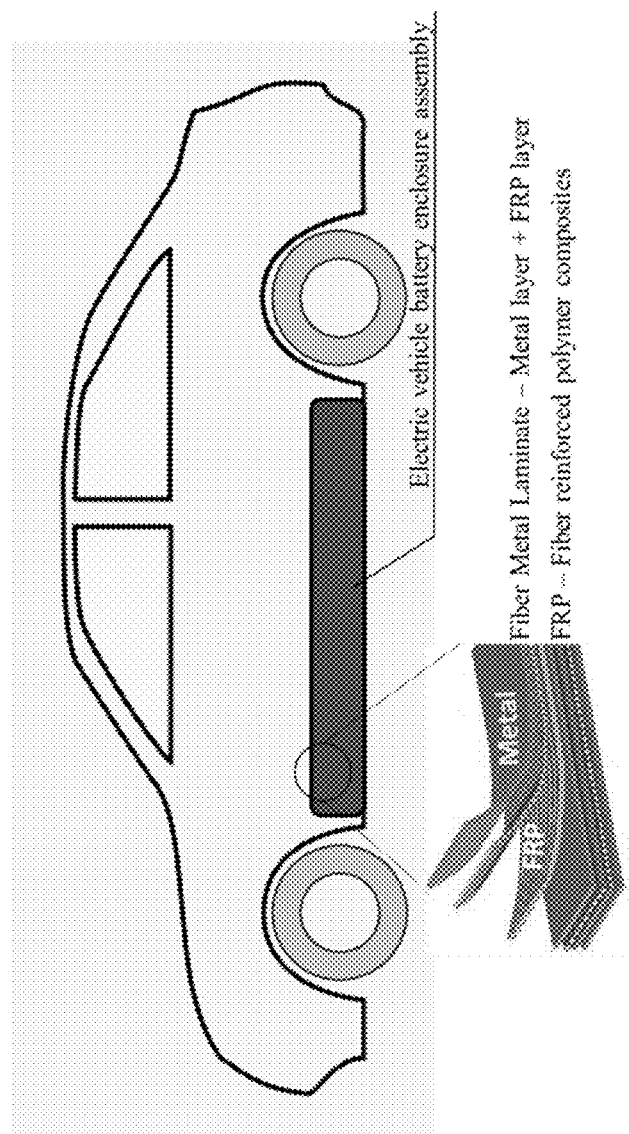
FIG. 3 depicts the location of an electric vehicle battery enclosure along with a schematic depiction of a composite material used for the electric vehicle battery enclosure.

The invention provides an impact-resistant, lightweight, EMI-shielding electric vehicle battery enclosure comprising a housing and a detachable cover positioned over the housing. FIG. 3 depicts an electric vehicle with its battery enclosure assembly and a schematic of a fiber metal laminate. The housing comprises a multiple-layer fiber-metal laminate, including at least one fiber-reinforced polymer composite layer; a first oleophilic surface-modified metal layer having a thickness from approximately 0.1 mm to 5 mm positioned on a first side of the at least one fiber-reinforced polymer composite layer; a second oleophilic surface-modified metal layer having a thickness from approximately 0.1 mm to 5 mm positioned on a second side of the at least one fiber-reinforced polymer composite layer). The multiple-layer fiber-metal laminate has a stiffness-to-weight ratio of at least 30 GPa/(g/cm$^3$).

The major advantages of this invention stem from its advanced fiber metal laminate (FML) composites. Compared to conventional composite materials, FMLs have superior properties, including light weight, excellent corrosion resistance, flame resistance, high tensile strength and modulus, high impact damage, and fatigue resistance. Generally, an FML is composed of a laminate structure of a metal plate and fiber-reinforced plastics (FRP). This unique geometrical structure features the best traits of each material; incorporating a metal plate as a shield greatly enhances the impact resistance of FRP, especially CFRP. FRP and FML also offer a high stiffness-to-weight ratio, that is, at least 30 GPa/(g/cm$^3$). The fiber used can be, e.g., carbon fiber, glass fiber, Kevlar fiber, ultra-high-molecular-weight polyethylene (UHMWPE) fiber, and the metal used can be, e.g., aluminum, titanium, magnesium and its alloys. FML composites display exceptional fatigue resistance because the fibers bridge fatigue cracks, as a result of the residual stress system between metal layers and the composite lamina.

Figures 4A, 4B:
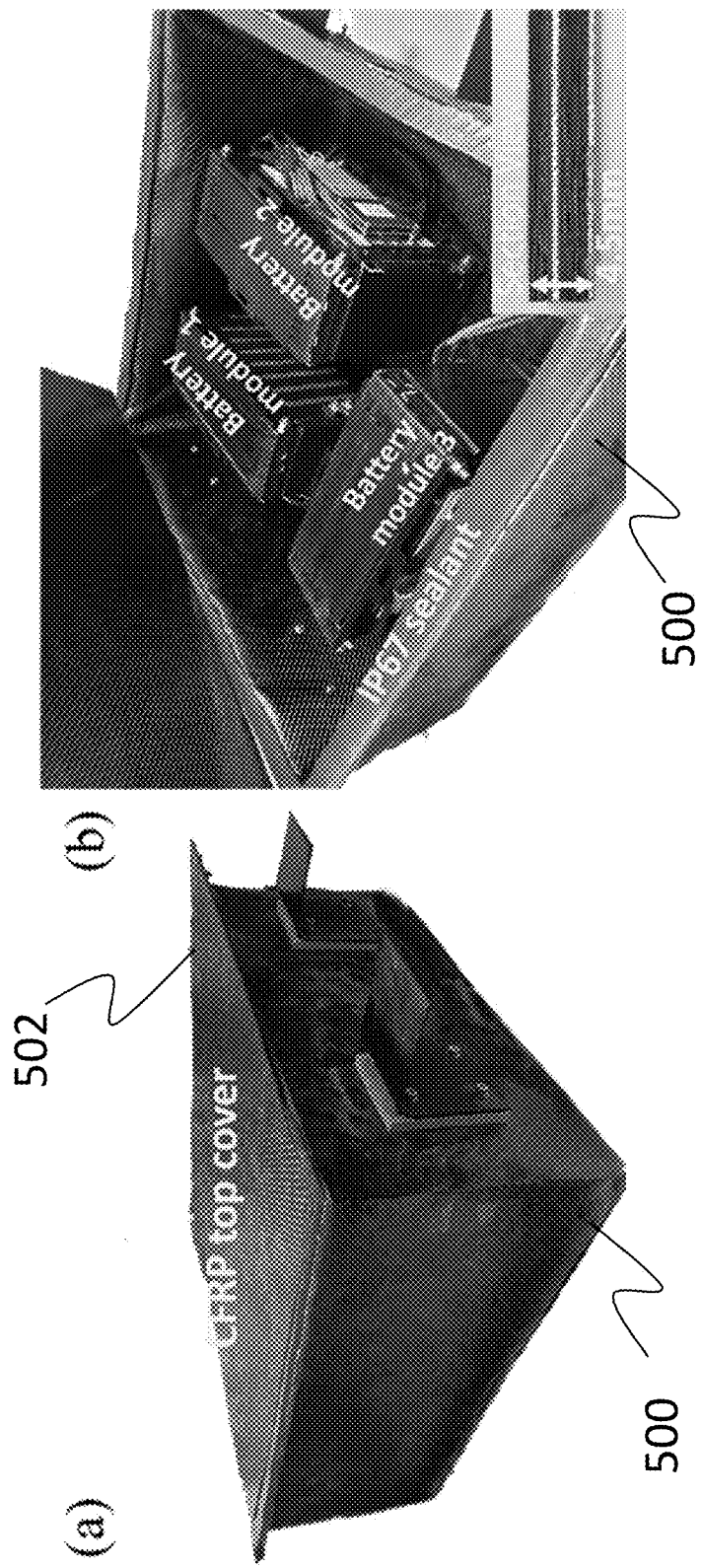
FIGS. 4A-4B depict an EV battery enclosure.

A typical electric vehicle (EV) battery pack is an approximately rectangular box 500 with a cover 502 as seen in FIG. 4A. Other optional features may include a battery pack support, tray, cover (502), sub-enclosure, or the like, with mechanical design features such as cell spacers, damping pads, pressure relief or exhaust valves, and seals/gasket. FIG. 4B depicts three battery modules housed within the battery enclosure 500. With the growing demand of modern EVs increased performance and the increased energy storage of advanced battery cells, higher standard requirements of the battery packs are also needed. These include impact resistance, fire resistance, and high tensile/bending strength.

These requirements can be better served by utilizing an FML material system. Under the nominal loading conditions of an EV battery pack, the quasi-static load conditions exert pressure on the bottom basal body from the weight of the heavy Li-ion batteries. The front and backload pressures exerted on the battery pack are due to the acceleration and deceleration of the vehicle, and load transferred on the long side walls is due to the turning maneuverability and connections with other parts in EV. An FML-based battery enclosure can be safely designed by addressing tensile, bending, and interlaminar properties.

Impact collision presents another major challenging load condition for EV battery casing. Ductile in nature, metals can absorb a large amount of energy in the elastic region up to the yielding and bear a high strain rate before failure in an impact. Composite materials that are brittle due to thermosetting resins may absorb the energy only in the elastic region before different modes of failure occur in the composite laminate. With metal and the FRP composite system, FML amplifies both materials' impact damage resistance. A battery enclosure made of FML improves the robustness of the EV battery casing. The impact resistance of the FML system shows improved impact resistance and minimum deformation instead of the FRP system alone. Introducing a thin metal layer allows the material to resist an impactor that would otherwise create a perforation in the composite system. From this, it is evident that FML has improved impact resistance, which can be adopted in the EV battery casing or enclosure.

Material index (M) is a measure of the combination of material properties, indicating the suitability of the material for a particular application. In the design of a lightweight EV battery pack, structural enclosure parts suitable for high bending stress should use a material index $$(\sqrt[3]{E}/\rho)$$

as high as possible. E is the Young's modulus and ρ is the volume density of the material system.

Among possible materials for EV battery enclosures/housings, CFRP scores a high material index due to its stiffness and lower density. However, FML that is a combination of metal (aluminum alloy) with CFRP scores a higher material index than other FML. The impact resistance of the FRP system is poor due to the completely brittle system (thermosetting matrix and brittle carbon fiber). FML uses the advantage of ductile aluminum alloy with a combination of brittle FRP, enhancing the impact resistance.

Figure 1A:
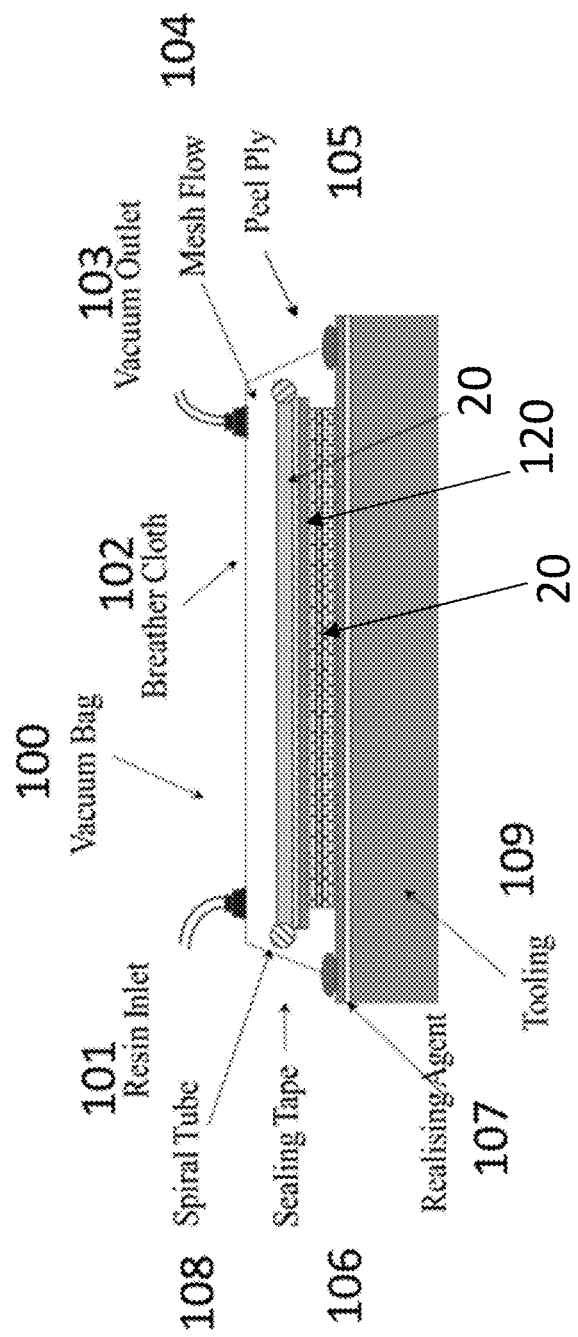
FIGS. 1A-1B depict the fabrication of poly methyl methacrylate-based thermoplastic composites system using a VARI process in accordance with one embodiment of the present invention (FIG. 1A) and the resultant composites (FIG. 1B).

The battery enclosure of the present invention may be fabricated in a Vacuum Assisted Resin Infusion (VARI) process using a configuration of aluminum alloy combined with CFRP. FIG. 1A depicts a vacuum assisted resin infusion system 10 for fabricating the composites of the present invention. In a VARI process, dry preform fabrics 20 (also seen in FIG. 2B) are placed in an open mold 109 and a plastic vacuum bag 100 is placed on the top of the mold 109; metal plates 120 are placed adjacent to the preform fabrics/fiber layers. The one-sided mold is connected with a resin source 101 and a vacuum outlet 103 (connected to a vacuum pump, not shown). The liquid resin infuses into the reinforcing fibers 104 due to the vacuum 103 drawn through the bag 100.

Figure 1B:
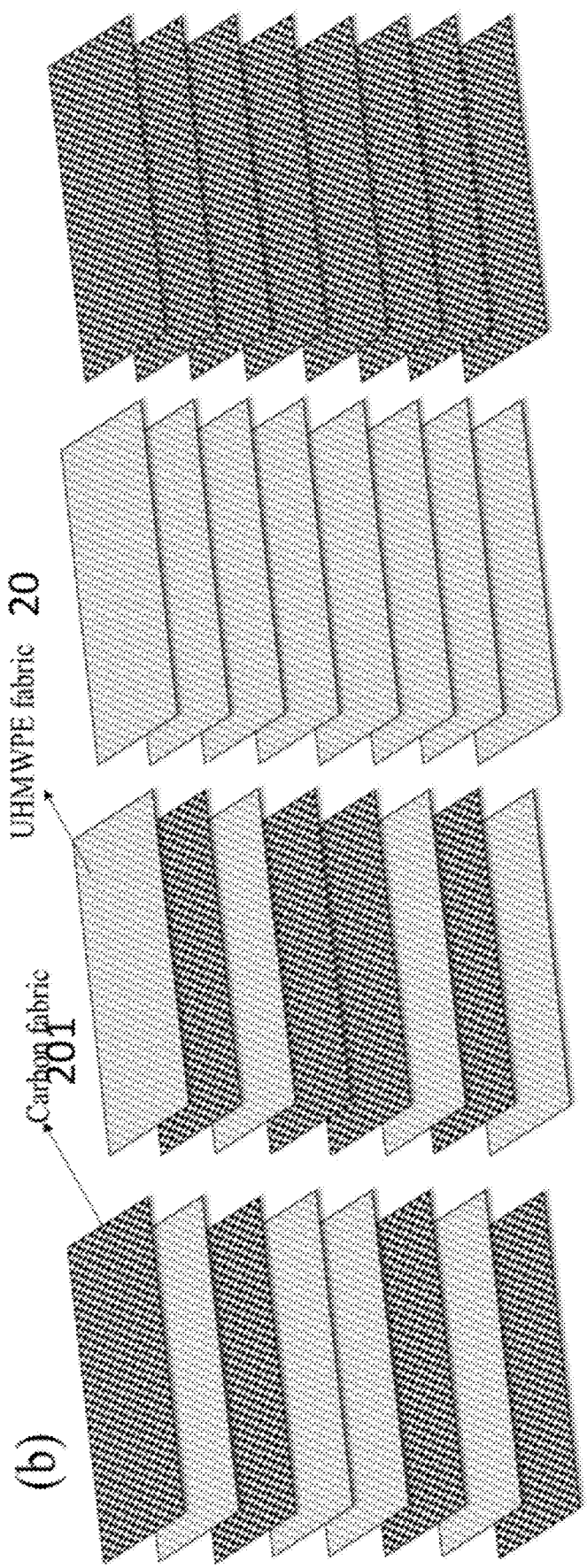

The fabrication of poly methyl methacrylate (PMMA)-based thermoplastic composites system follows a VARI process. The VARI method consists of a vacuum pump, pressure pot, inlet 101, and vacuum outlet 103, hoses for infusion of resin, peel plies 105, breather 102, mesh flow 104, and spiral tube 108 for the fabrication process. The reinforcement in the composites is a plain-woven UHMWPE fabric 20 (FIG. 1B) and carbon fabric 201 (FIG. 1B), cut into the required dimensions. The fabrics are washed and dried first before the fabrication process. The reinforcement is maintained in the dry cabinet after the washing and drying process at a relative humidity of 40%. Two different grade UHMWPE fibers may be used as the reinforcement for the complete thermoplastic composites system, both the reinforcement and the matrix.

Figure 2B:
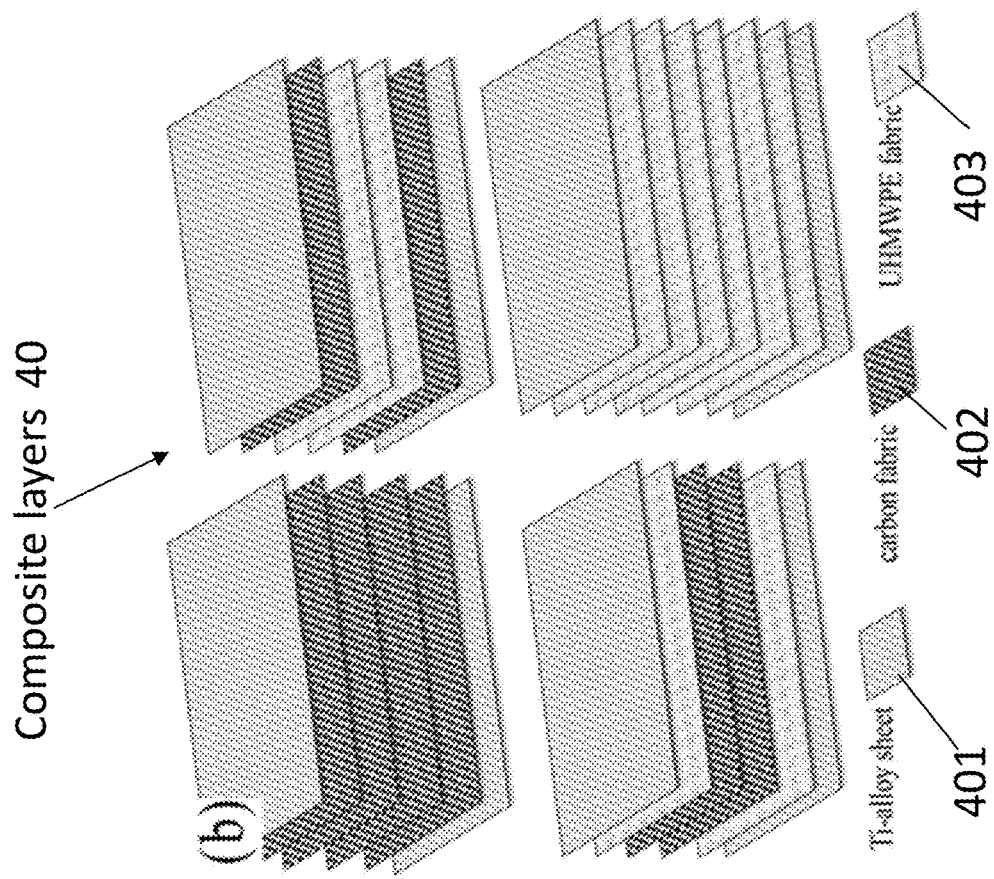
FIGS. 2A-2B depicts the fabrication of thermoplastic FML composites (FIG. 2A) and the resultant composite (FIG. 2B) in accordance with one embodiment of the present invention.
Figure 2A:
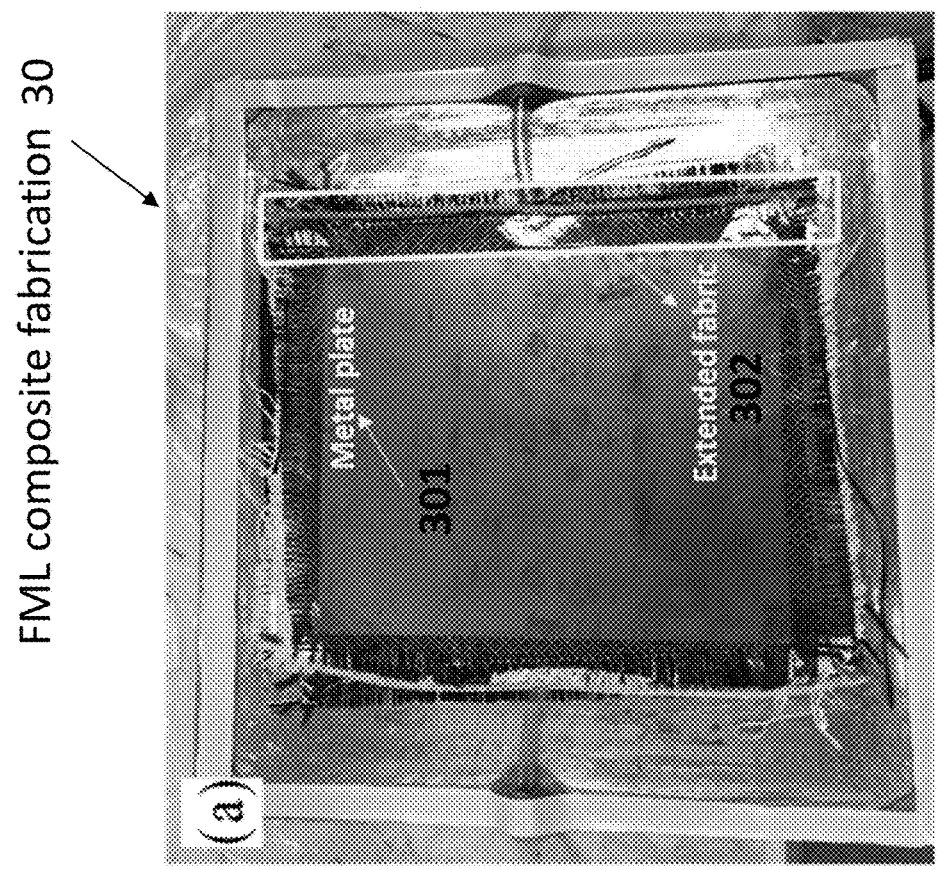

FIGS. 2A-2B depict another hybrid composite system fabricated with the combination of plain-woven carbon fabric and the UHMWPE fabric alternately stacked 40. After the stacking of fabric in the vacuum bag 30, a vacuum pump is actuated to remove the air trapped between the layers. After checking for any leakage in the vacuum setup, a thermoplastic resin, an example of which is PMMA, is prepared before the resin infusion process. 2 wt. % of benzoyl peroxide (BPO) powder is mixed with the matrix to initiate the radical polymerization reaction. The mixed viscosity of the resin and initiator together is about 200 cP which has a low viscosity for resin infusion. The infusion process can be achieved at a vacuum pressure between 100-500 mbar. The resin inlet receives a liquid resin to infiltrate the composite layers. After the successful resin infusion, both the inlet and the outlet of the vacuum bagging system are closed, and the laminates are cured on a large size curing table supporting the out-of-autoclave process. The curing temperature is set to 80° C. for 4 h. Though the curing can be done at room temperature, curing the samples at 80° C. for 4 h is recommended to ensure better mechanical properties. After the curing process, the composite samples are taken out from the vacuum bagging setup for further processing, if required.

A titanium alloy metal plate 301 (FIG. 2A) with a thickness of about 0.4 mm is used on the outer side of the laminate and the core of the material is made up of a thermoplastic FRP system with different reinforcement of UHMWPE and carbon fiber, examples of which are depicted in FIG. 2B. Once the metal and fabric are stacked inside the vacuum bag, the resin is prepared for the infusion process. The fabric 302 is optionally extended from the metal plate and the mesh flow is placed over the fabric to act as a guide for the resin flow. This eventually reduces the extra resin that flows over the top and bottom of the metal plate during the resin infusion process. This method is applicable to both thermosetting and thermoplastic resin infusion processes. The resin is infused in the vacuum bag and the sample is cured at room temperature.

The fiber metal laminates 40 (FIG. 2B) are fabricated by combining the FRP layer and the metal layer together with a pre-impregnated basalt and carbon fiber 402 with a titanium-aluminum alloy 401. However, the metal and FRP can be a combination of many different metals and fibers stacked together at different orientations.

To mitigate galvanic corrosion between CFRP and aluminum alloy, electrically insulating basalt FRP may optionally be used to prevent electrical connection between the carbon and the metal.

To enhance the metal/composite interface, the metal may be surface modified by an electrochemical process. After the surface modification process, the metal shows an enhanced oleophilic surface, which improves the adhesion of FRP. For FML, the interface between metal and FRP is an important feature for the sandwich structure's performance. To increase the adhesive strength at the metal composite interface, several aluminum surface treatment methods may be used to pre-process the aluminum alloy. The electrochemical surface treatment method is followed to modify the metal surface. The primary step in the aluminum surface treatment is phosphoric acid anodization, and a series of preliminary and subsequent treatments may be conducted to complete the treatment processes and to ensure the quality of the treated aluminum.

Figure 5A:
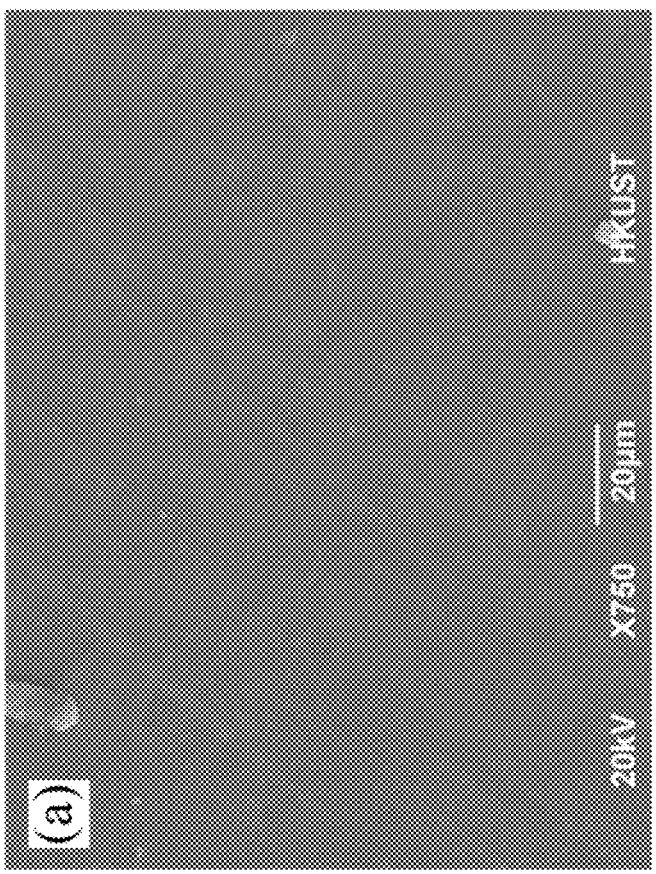
FIGS. 5A-5B depict pristine and electrochemically treated metal surfaces.
Figure 5B:
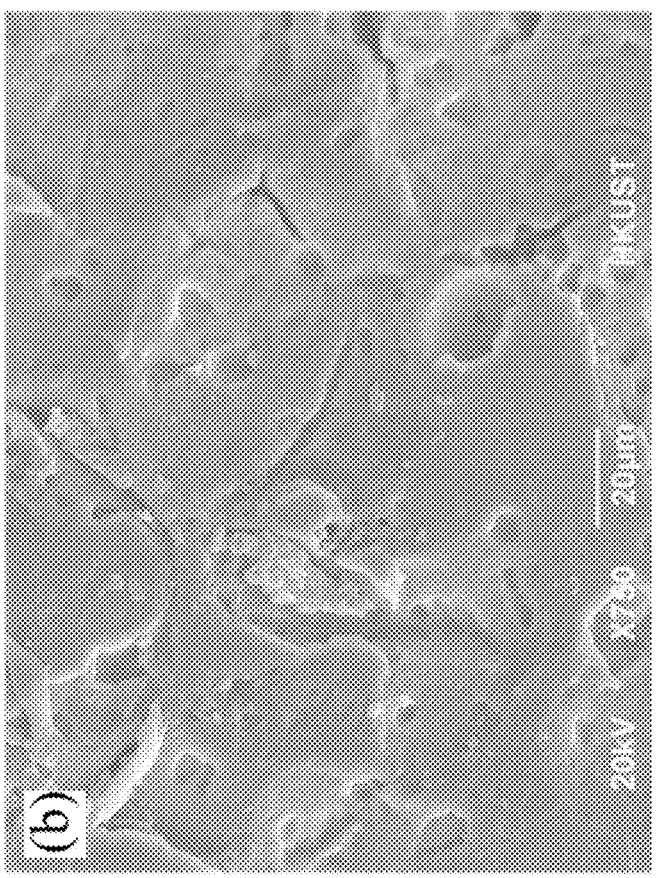
Figure 6:
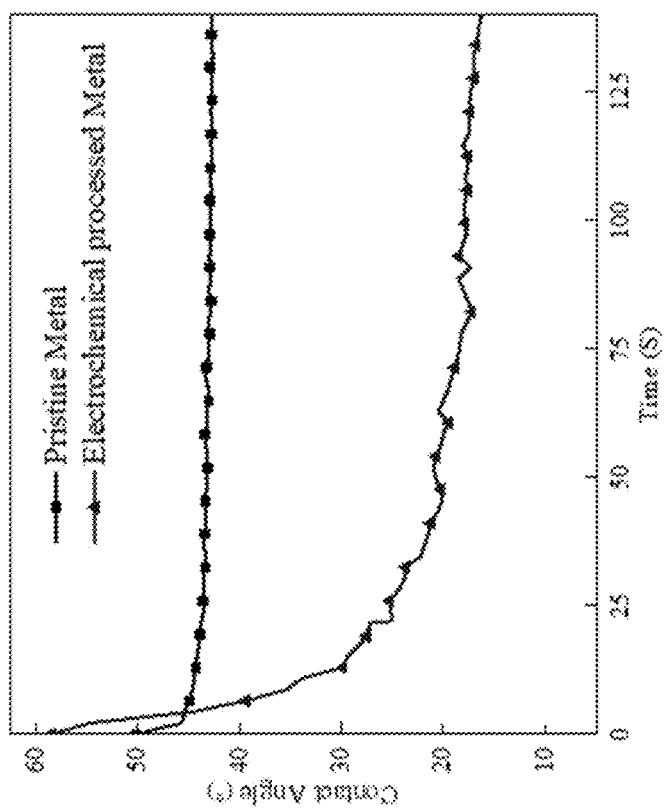
FIG. 6 shows the liquid contact angle for pristine and electrochemically treated metal surfaces.

The complete surface treatment process includes six main steps: degreasing, alkaline cleaning, etching, anodizing, post-anodizing dip, and final rinsing and drying. FIG. 5A depicts a smooth pristine surface while FIG. 5B shows an enhanced oleophilic electrochemically-roughened surface for improved bonding between the fiber-reinforced polymer composite and metal in a fiber metal laminate composite system. A plot of the liquid contact angle for untreated, pristine metal vs. the lower contact angle for the electrochemically processed metal surface is depicted in FIG. 6. As seen in FIG. 6, the contact angle is decreased to approximately 20 degrees for treatments of greater than approximately 30 seconds.

To further enhance the metal and composite interface, a film-based thermosetting adhesive may be used between the FRP and the metal layer. Metal, film adhesive, and FRP are cured together to support the co-curing process with the out-of-autoclave process. The battery housing is fabricated by a similar process by combining the metal and FRP together in a metallic mold. After curing the FML lower battery tray, the battery enclosure is processed to add the additional lifting lugs by a drilling process. A sealant such as an IP67-compliant sealant is used to attach on all the sides of the lower battery tray. Followed by the sealant, the FRP-based top cover is attached to the lower battery tray to complete the fabrication process.

Figure 7:
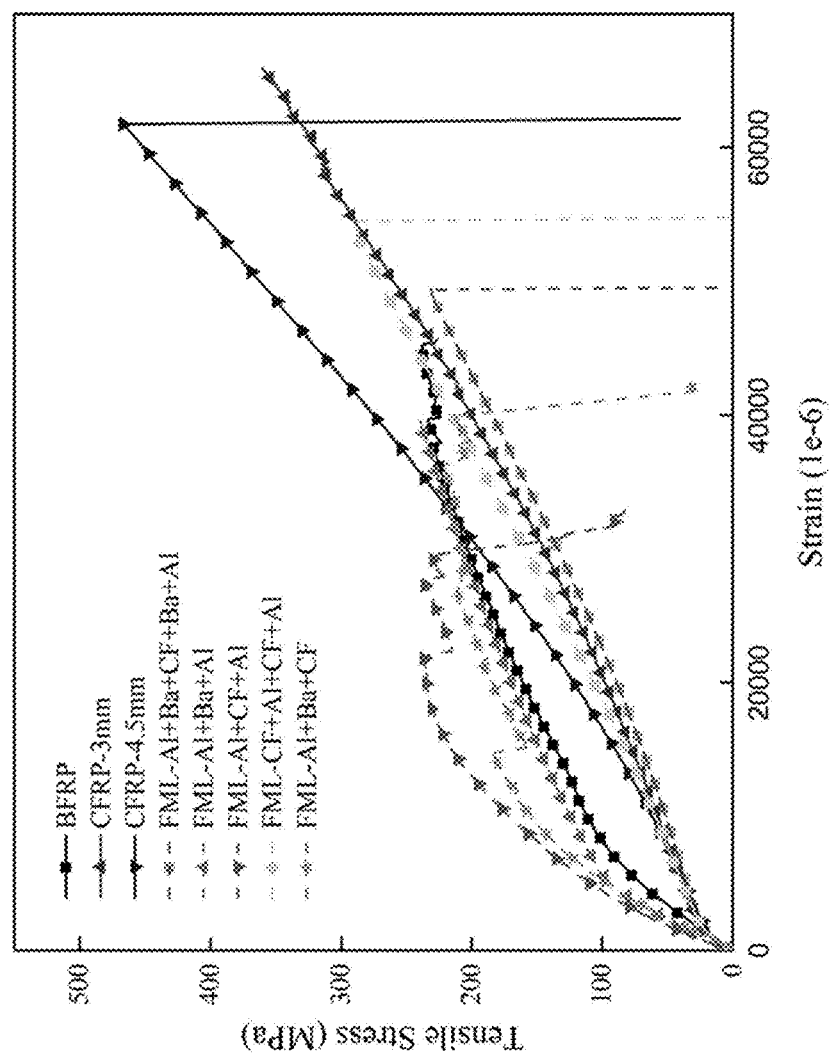
FIG. 7 shows stress-strain curves of different material configurations under a tensile loading.

Results of tests with a universal testing machine, comparing the adopted FML configuration versus other configurations, show that compared to pure woven CFRP, FML with aluminum alloy has a lower tensile modulus. This is due to the plasticity of the aluminum alloy and the interface failure between metal and CFRP. The maximum stress of FML is significantly lower than pure woven CFRP. For FML with a configuration of Al+Ba+CF+Ba+Al, after adding some layers of basalt FRP and adhesive films between aluminum and CFRP, the metal and composite interface improves, leading to higher strength and modulus. Conversely, a high strain-to-failure is achieved, demonstrating FML's excellent adaptability and flexibility as a structural component. Test results are depicted in FIG. 7.

To study the mechanical properties of the thermoplastic FRP and FML composites the samples were cut into the required dimensions as per the ASTM standards. Tensile test (ASTM D3030), Intralaminar shear test (ASTM D5379), Interlaminar shear test (ASTM D2344), Compression test (ASTM D6641), and Flexural tests (ASTM D7264) were carried out to study the mechanical properties. The results are given in the Examples section, below.

The low-velocity impact tests were carried out on the thermoplastic FRP and FML composites. The thermosetting FRP composites that were fabricated by resin infusion process were also tested with a low-velocity impact to show the difference from thermoplastic FRP composite system. The compared results reveal that the PMMA thermoplastic FRP samples show improved performance when absorbing the impact energy and failure of the thermoplastic composites than the thermosetting-resin-based FRP composites.

EXAMPLES

Example 1: Laminate Composites for EV Battery Enclosures

Several materials and composites were analyzed based on composition and whether or not there is a metal surface modification process performed. The metal volume fraction is shown along with the thicknesses. These materials are later employed in various tests described in further examples. Table 1 lists various composite configurations that were fabricated and tested:

TABLE 1

Laminate composite configuration for developing the EV battery enclosure

| Laminate code* | Thickness | Metal surface modification | Metal volume fraction |
|---|---|---|---|
| Basalt FRP (BFRP) | 3 mm | NA | 0 |
| Carbon FRP (CFRP) | 3 mm, 4.5 mm | NA | 0 |
| FML-AL + Ba + AL | 3 mm | Electrochemical process | 0.33 |
| FML-AL + Ba + CF | 3 mm | Electrochemical process | 0.17 |
| FML-AL + CF + AL | 3 mm | Electrochemical process | 0.33 |
| FML-Al + Ba + CF + Ba + Al | 3 mm | Electrochemical process | 0.33 |
| FML-CF + Al + CF + Al | 4.5 mm | Electrochemical process | 0.22 |
| Steel alloy (SS316) | 2.6 mm | NA | 1 |
| Aluminium alloy (2024-T3) | 3 mm | NA | 1 |

*Al: 0.4 mm Aluminium alloy sheet
CF: Carbon plain weave pre-impregnated fabric
Ba: Basalt plain weave pre-impregnated fabric The mechanical properties of various composites and individual components were determined along with the corresponding material index. The results are provided in Table 2:

TABLE 2

Material Index of the laminate composite configuration for developing an EV battery enclosure

| Laminate code | Composite strength (MPa) | Composite modulus (GPa) | Volume density (g/cm$^3$) | EV battery pack fabrication process | Material Index (M) |
|---|---|---|---|---|---|
| Basalt FRP (BFRP) | 260 | 20 | 1.55 | Prepreg/VARTM | 1.75 |
| Carbon FRP (CFRP) | 456 | 50 | 1.38 | Prepreg/VARTM | 2.67 |
| FML-AL + Ba + AL | 251 | 23 | 1.92 | Prepreg/VARTM | 1.48 |
| FML-Al + Ba + CF + Ba + Al | 278 | 37 | 1.64 | Prepreg/VARTM | 2.03 |
| FML-AL + CF + AL | 231 | 30 | 1.78 | Prepreg/VARTM | 1.74 |
| FML-CF + Al + CF + Al | 230 | 28 | 1.47 | Prepreg/VARTM | 2.07 |
| Titanium alloy | N/A | 115 | 4.50 | Bending, stamping, Welding | 1.08 |
| Steel | N/A | 210 | 7.90 | Bending, stamping, Welding | 0.75 |
| Aluminium | N/A | 72 | 2.74 | Bending, stamping, Welding | 1.51 |

*Al: 0.4 mm Aluminium alloy sheet
CF: Carbon plain weave pre-impregnated fabric
Ba: Basalt plain weave pre-impregnated fabric The general weight configuration of EV battery enclosures was determined by combinations of different metals and fiber-reinforced polymers. The amount of weight reduction by using fiber reinforced polymers is shown in the last column of Table 3.

TABLE 3

General weight configuration of EV battery enclosure with combination of different metal and FRP

| Item description | Weight of metal (Kg) | Weight of composite (Kg) | Total Weight (Kg) | Weight reduction (%) |
|---|---|---|---|---|
| Steel alloy SS316 | 219.4 | NA | 219.4 | 0 |
| CFRP | NA | 50.9 | 50.9 | 76.7 |
| CFRP + Al alloy | 51.2 | 16.8 | 68.0 | 68.9 |
| CFRP + Ti alloy | 100.5 | 10.7 | 111.3 | 49.2 |
| CFRP + Mg alloy | 29.0 | 20.9 | 49.9 | 77.2 |
| GFRP | NA | 71.9 | 71.9 | 67.2 |
| GFRP + Al alloy | 46.9 | 27.7 | 74.7 | 65.9 |
| GFRP + Ti alloy | 92.6 | 19.6 | 93.6 | 57.3 |
| GFRP + Mg alloy | 24.9 | 36.2 | 61.1 | 72.1 |

GFRP—Glass fiber-reinforced polymer ($\rho$ = 1.25-2.50 g/cm$^3$)
CFRP—Carbon fiber-reinforced polymer ($\rho$ = 1.80-2.00 g/cm$^3$)
Ti—Titanium alloy ($\rho$ = 4.5 g/cm$^3$)
Mg—Magnesium alloy ($\rho$ = 1.74 g/cm$^3$)
Al—Aluminium alloy ($\rho$ = 2.7 g/cm$^3$)

Example 2: Mechanical Properties of Various Composites for EV Battery Enclosures Based on the various ASTM tests performed above, various properties were determined for the composite materials of the present invention.

Figures 8A, 8B:
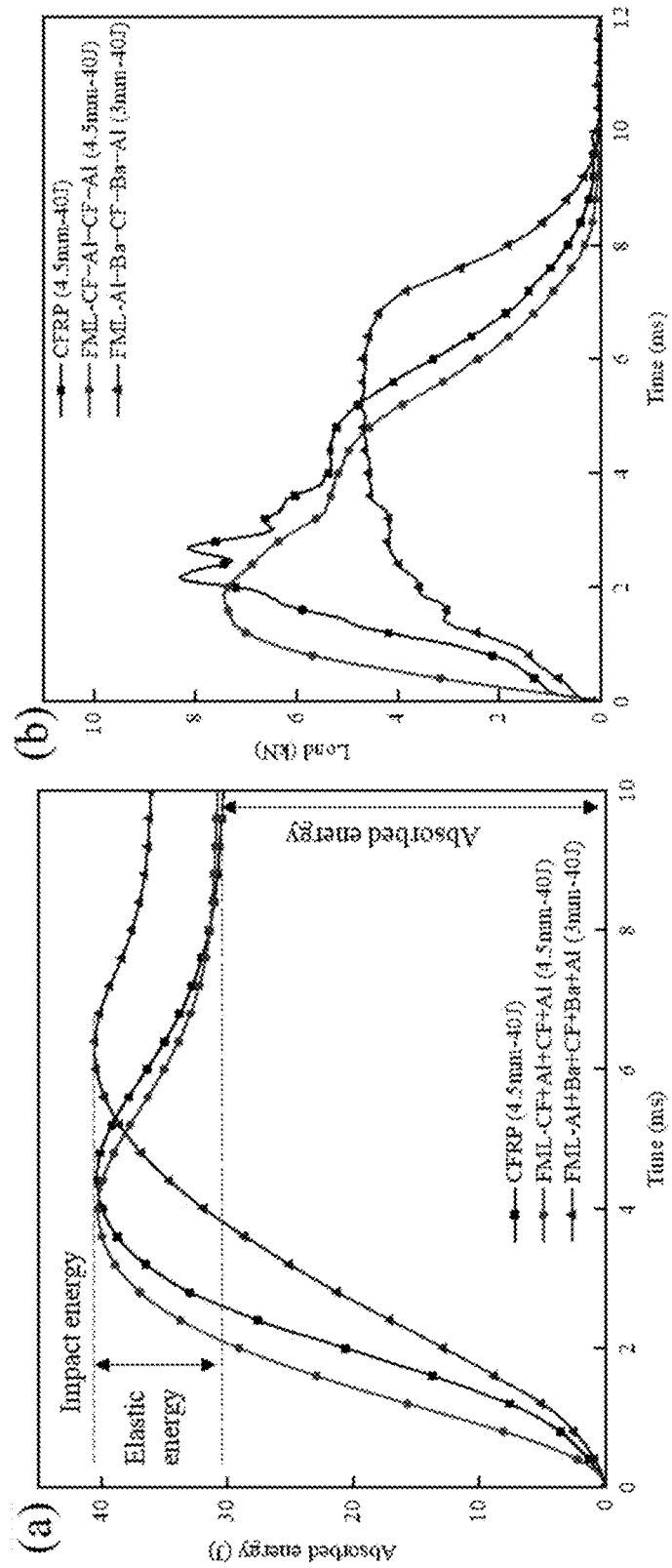
FIGS. 8A-8C show the impact response of 4.5 mm based monolithic composites and FML configurations under impact energy of 40.
Figure 8C:
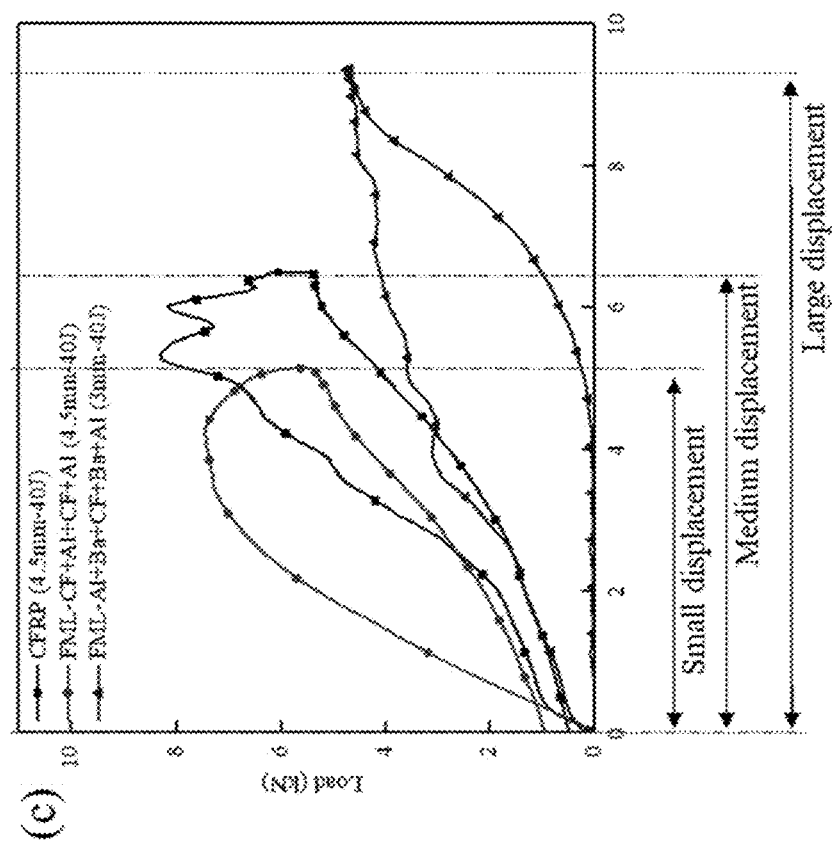

The impact response of 4.5 mm based monolithic composites and FML configurations under impact energy of 40 J is depicted in FIGS. 8A-8C. FIG. 8A shows absorbed energy vs time curves showing energy absorption by laminates. FIG. 8B shows load vs time. FIG. 8C are load-displacement curves showing deformation after an impact. These show the improved properties of composites including metal layers over composites that do not include metal layers.

FIGS. 9A-9B show cross-sectional images of fiber metal laminate composites after 40 J of impact energy (a) FML-CF+Al+CF+Al (b) FML-Al+Ba+CF+Ba+Al demonstrating displacement without rupture of the structure for materials of the present invention.

Figures 10A, 10B:
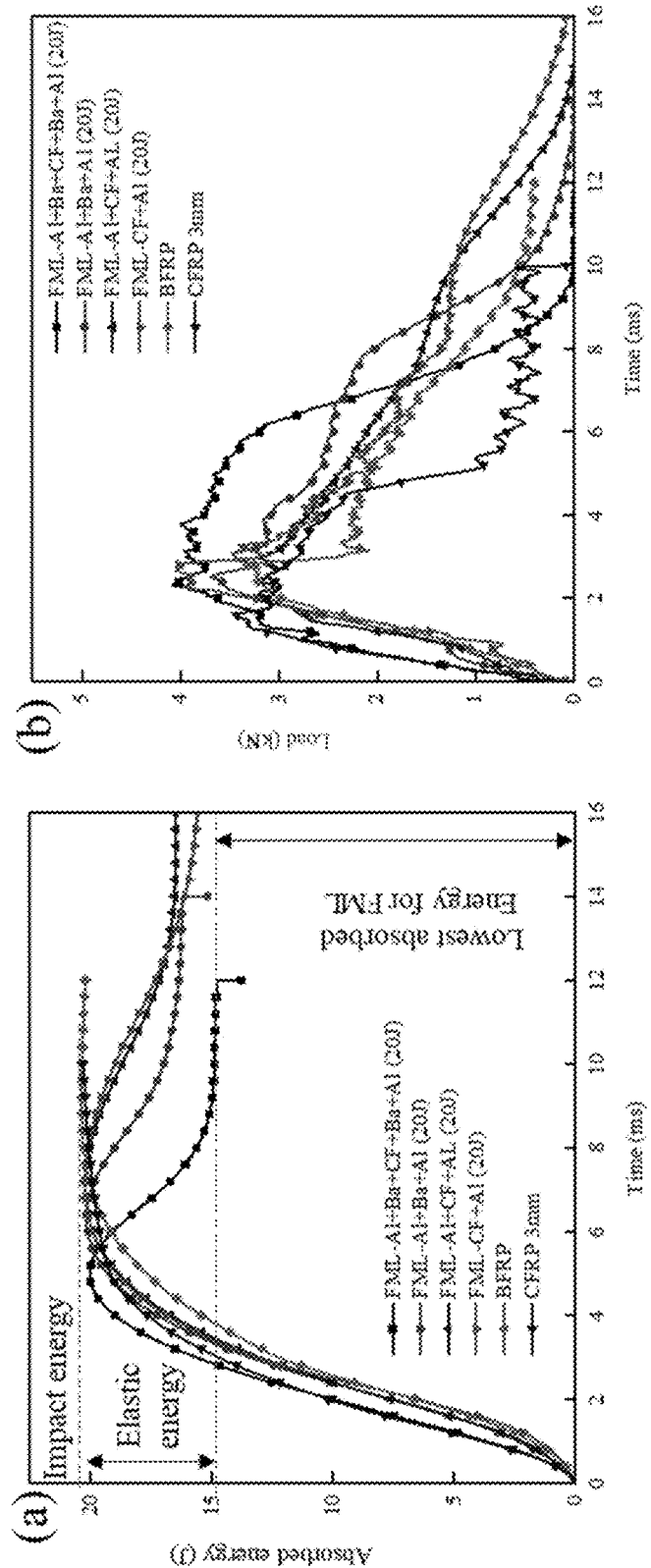
FIGS. 10A-10B demonstrate the impact response of monolithic composites, compared to the FML configurations of the present invention under impact energy of 20 J.
Figure 10C:
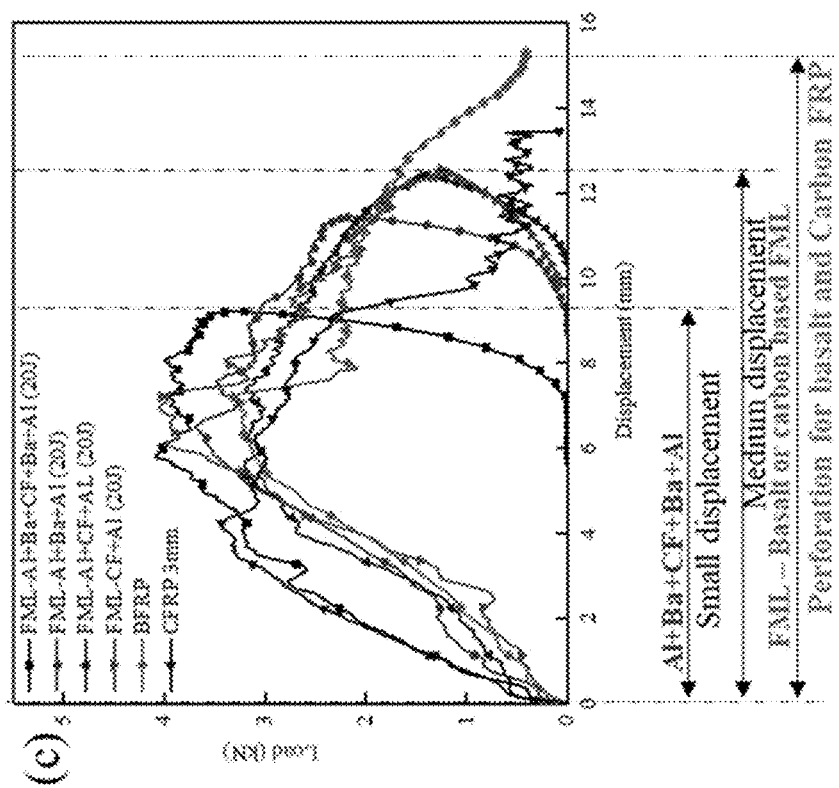
FIG. 10C shows load-displacement curves showing deformation after impact. The composites of the present invention demonstrate improved mechanical properties compared to prior art materials.

FIGS. 10A-10B demonstrate the impact response of steel alloy, aluminium alloy, and monolithic composites, compared to the FML configurations of the present invention under impact energy of 20 J (10A) absorbed energy vs time curves showing energy absorption by laminates (10B) load vs time (10C) load-displacement curves showing deformation after impact. The composites of the present invention demonstrate improved mechanical properties compared to prior art materials.

Figures 11A, 11B:
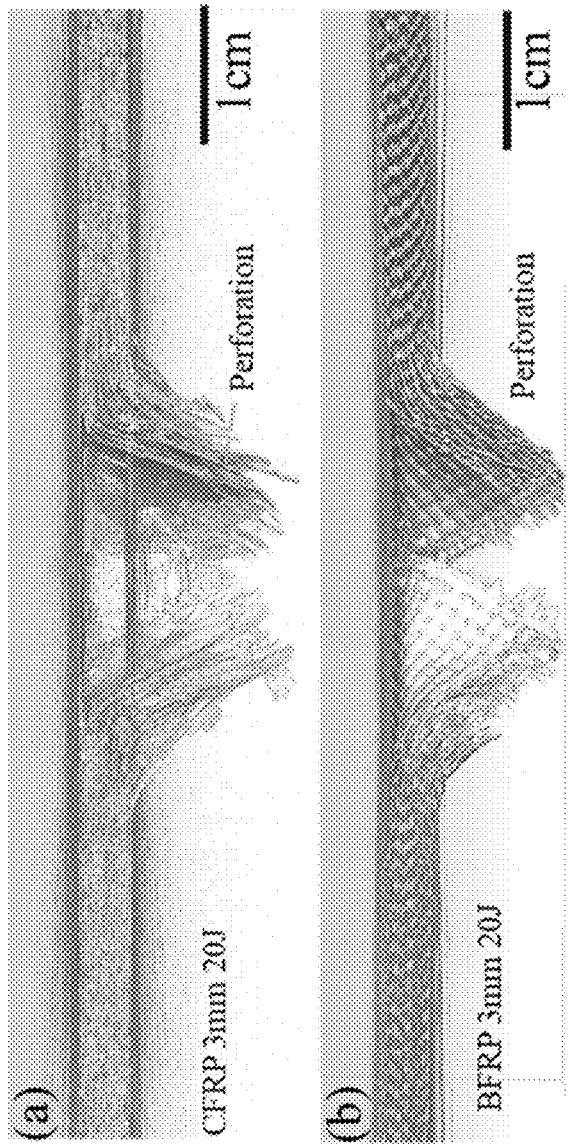
FIGS. 11A-11B show cross-sectional images of monolithic FRP composites after 20 J of impact energy.

FIGS. 11A-11B show cross-sectional images of monolithic FRP composites after 20 J of impact energy (11A) Carbon FRP impact at 20 J (11B) Basalt FRP impact at 20 J. These prior art materials show undesirable perforation at that level of impact energy.

FIGS. 12A-12B show cross-sectional images fiber metal laminate composites after 20 J of impact energy: (12A) FML-Al+Ba+CF+Ba+Al impact at 20 J (penetration) (12B) FML-Al+CF+Al impact at 20 J (penetration). The composite of FIG. 12A demonstrated good performance with no perforation due to a strong metal/composite interface.

Figures 13A, 13B, 13C, 13D:
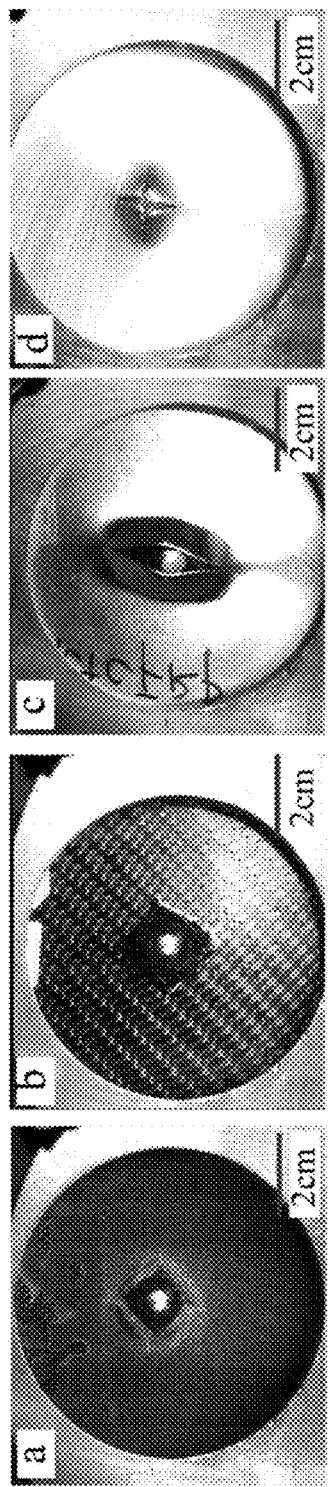
FIGS. 13A-13H show the rear side impact of monolithic FRP composites and FML composites after the impact energy captured by high-speed camera.
Figures 13E, 13F, 13G, 13H:
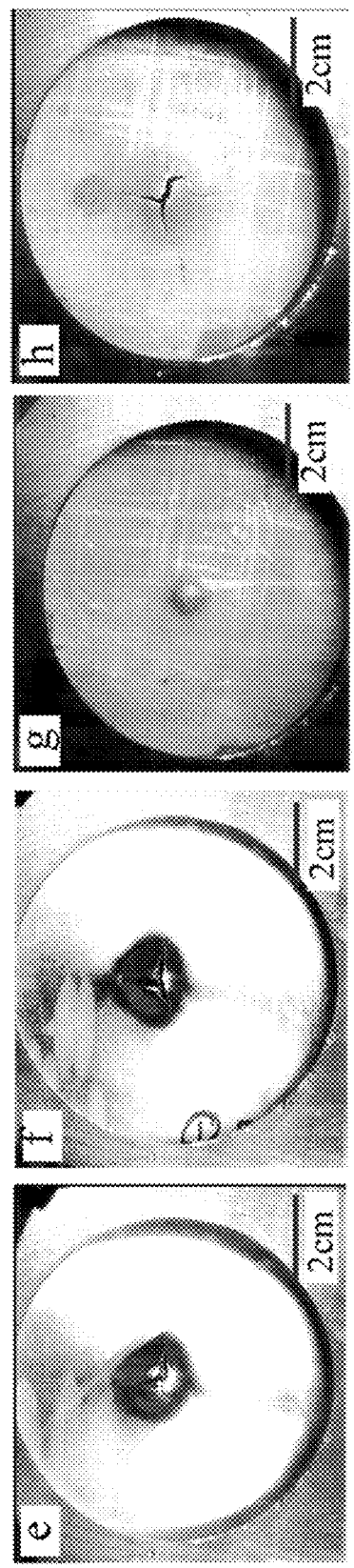

FIGS. 13A-13H show the rear side impact of prior art monolithic FRP composites and the novel FML composites after the impact energy captured by high-speed camera: FIG. 13A: Basalt FRP impact at 20 J (perforation); FIG. 13B: Carbon FRP impact at 20 J (perforation); FIG. 13C: FML-Al+CF+Al impact at 20 J (penetration); FIG. 13D: FML-Al+Ba+Al impact at 20 J (penetration); FIG. 13E: FML-Ba+CF+Al impact at 20 J (penetration); FIG. 13F: FML-Al+Ba+CF+Ba+Al impact at 20 J (penetration); FIG. 13G: FML-CF+Al+CF+Al impact at 20 J (penetration); FIG. 13H: FML-CF+Al+CF+Al impact at 40 J (penetration).

Example 3: Measure Properties for Fiber-Reinforced Polymer (FRP) Composites

FIG. 14A-14D are the tensile properties of thermoplastic FRP composites: FIG. 14A stress-strain, FIG. 14B Young's modulus, FIG. 14C Poisson's ratios, and FIG. 14D ultimate strains.

Figure 15A:
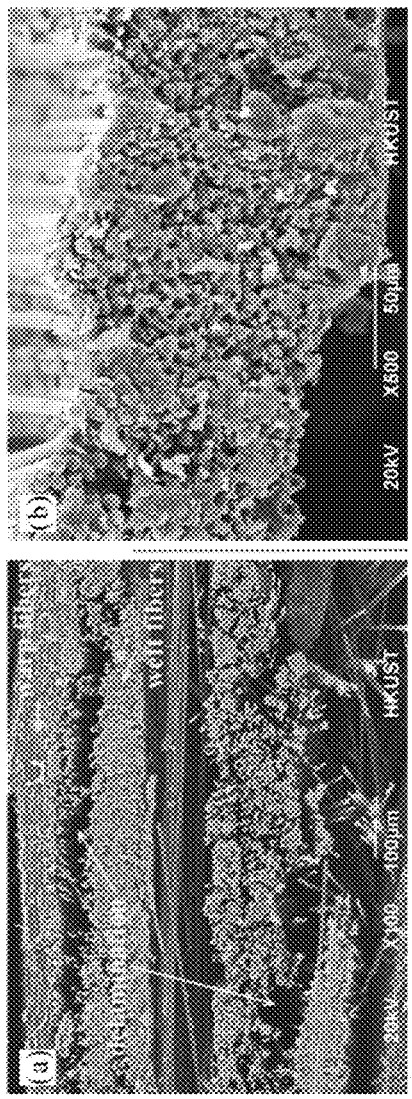
FIGS. 15A-15D are fracture images from the thermoplastic carbon fiber-based FRP.
Figure 15B:
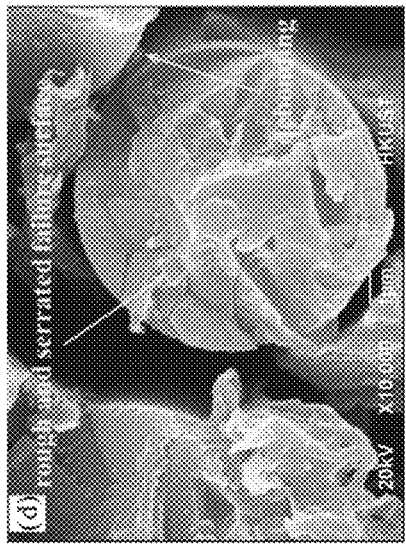
Figure 15C:
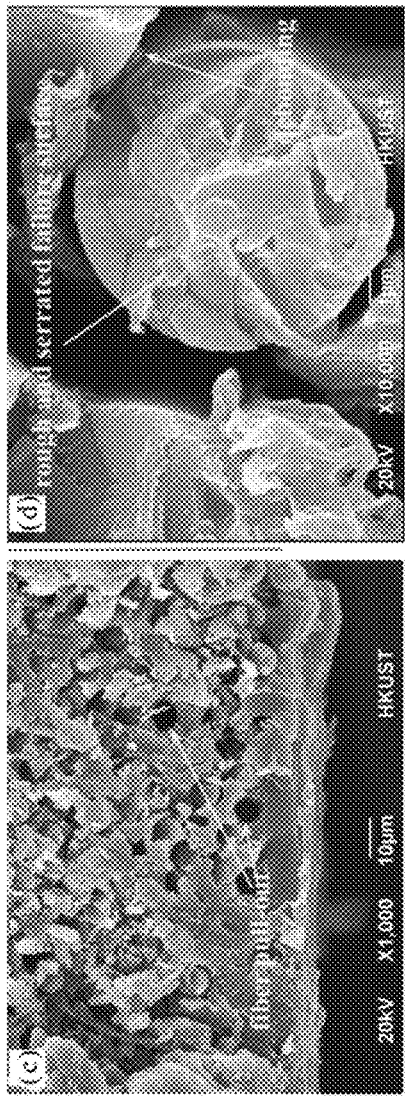
Figure 15D:

FIGS. 15A-15D are fracture images from the thermoplastic carbon fiber-based FRP: FIG. 15A warp and weft failures, FIG. 15B failure of a single weft fiber bundle, FIG. 15C fiber pull-out, and FIG. 15D fiber breakage surface.

FIGS. 16A-16D show the fracture images from the thermoplastic UHMWPE fiber-based FRP: FIG. 16A weft fiber pull-out, FIG. 16B debonding (among) and fiber pull-out, FIG. 16C delamination between weft and warp fibers, and FIG. 16D necking of UHMWPE fiber.

FIGS. 17A-17D show the compressive properties of thermoplastic FRP: FIG. 17A stress-strain curve, FIG. 17B Young's modulus, FIG. 17C Poisson's ratios, and FIG. 17D ultimate strains.

Figures 18A, 18B, 18C:
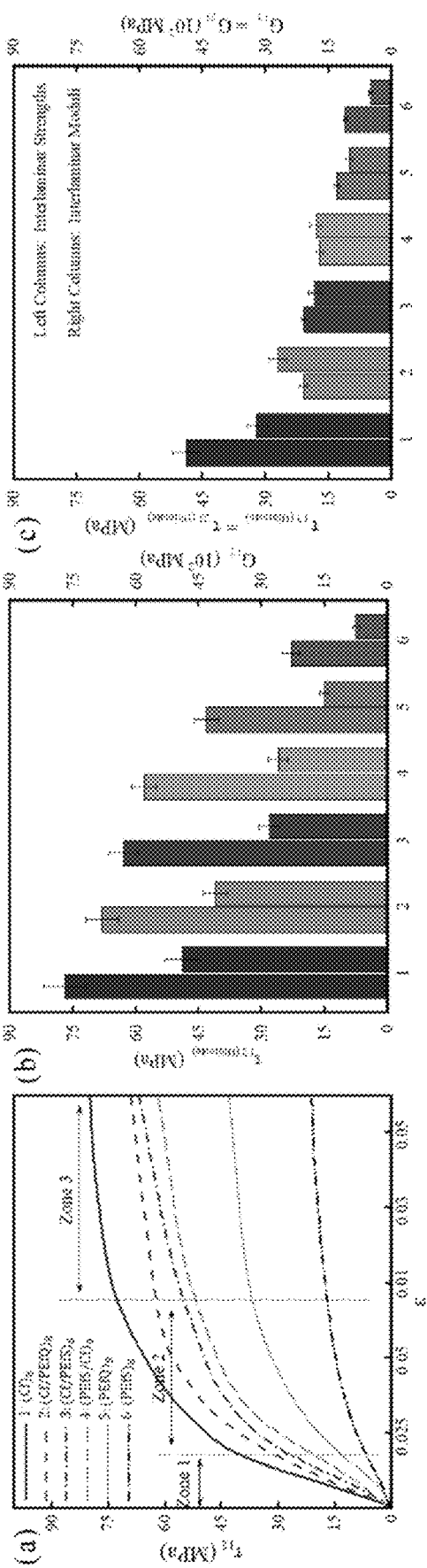
FIGS. 18A-18C show the in-plane shear properties of thermoplastic FRP according to the invention.

FIGS. 18A-18D show the in-plane shear properties of thermoplastic FRP according to the invention: FIG. 18A is a stress-strain curve, FIG. 18B is intralaminar, FIG. 18C is interlaminar.

FIGS. 19A-19D are the flexural properties of thermoplastic FRP: FIG. 19A is a stress-strain curve, FIG. 19B are flexural moduli, FIG. 19C are the ultimate flexural strengths, and FIG. 19D are the ultimate flexural strains.

Example 4: Vacuum-Assisted Resin Infusion Process for Fiber-Reinforced Polymer/Metal (FML) Composite Fabrication FIGS. 20A-20D are the tensile properties of thermoplastic FML: FIG. 20A shows tensile stress-strain curves, FIG. 20B are elastic moduli, FIG. 20C are Poisson's ratios, and FIG. 20D shows ultimate strains. The tested composites were titanium/carbon fiber (HTCL-1), titanium/TE fiber/carbon fiber (HTCL-2), titanium/carbon fiber/PE fiber (HTCL-3), and titanium/PE fiber$_3$ (HTCL-4). The table below correlates the codes to the layer structures that were tested includes composition of the layers, their thicknesses, and volume fractions:

TABLE 4

Thermoplastic FML composites configuration

| Laminate code | Laminate lay-up* | Thermoplastic FML |
|---|---|---|
| HTCL-1 | (Ti/Cf$_2$)$_S$ | Titanium alloy + Carbon fiber |
| HTCL-2 | (Ti/Cf/PEf)$_S$ | Titanium alloy + Carbon fiber + UHMWPE fiber |
| HTCL-3 | (Ti/PEf/Cf)$_S$ | Titanium alloy + UHMWPE fiber + Carbon fiber |
| HTCL-4 | (Ti/PEf$_3$)$_S$ | Titanium alloy + UHMWPE fiber |

*Ti: 0.4 mm Titanium Alloy Sheet
Cf: Carbon Plain Weave fabric
PEf: UHMWPE Plain weave fabric

| Laminate code | Laminate lay-up* | Thickness | Metal Volume fraction |
|---|---|---|---|
| HTCL-1 | (Ti/Cf$_2$)$_S$ | 1.70 ± 0.05 | 0.47 ± 0.02 |
| HTCL-2 | (Ti/Cf/PEf)$_S$ | 2.05 ± 0.05 | 0.39 ± 0.01 |
| HTCL-3 | (Ti/PEf/Cf)$_S$ | 2.10 ± 0.03 | 0.38 ± 0.05 |
| HTCL-4 | (Ti/PEf$_3$)$_S$ | 2.85 ± 0.05 | 0.28 ± 0.05 |

Figure 21A:
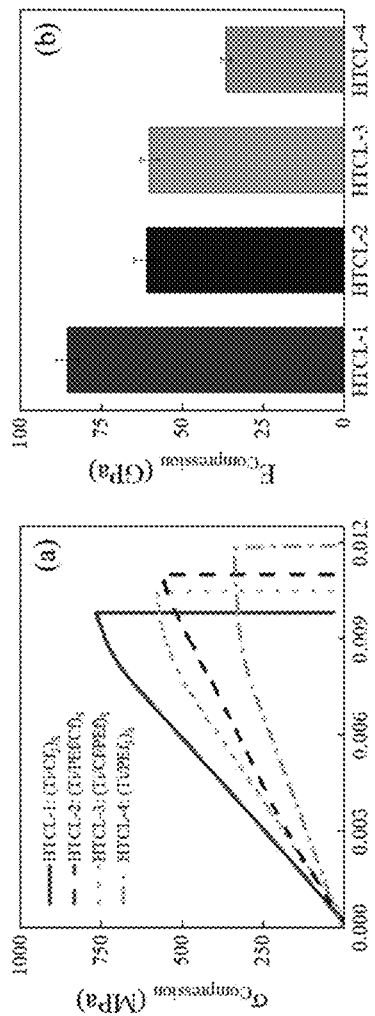
FIGS. 21A-21D are the compressive properties of thermoplastic FML.
Figure 21B:
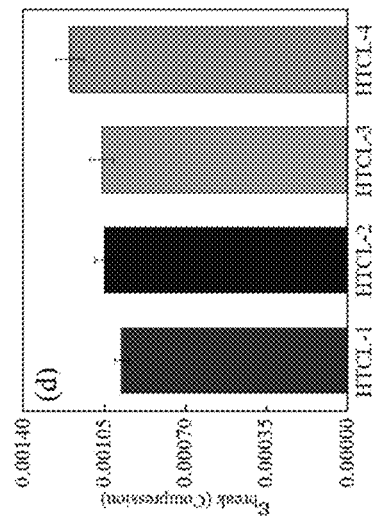
Figure 21C:
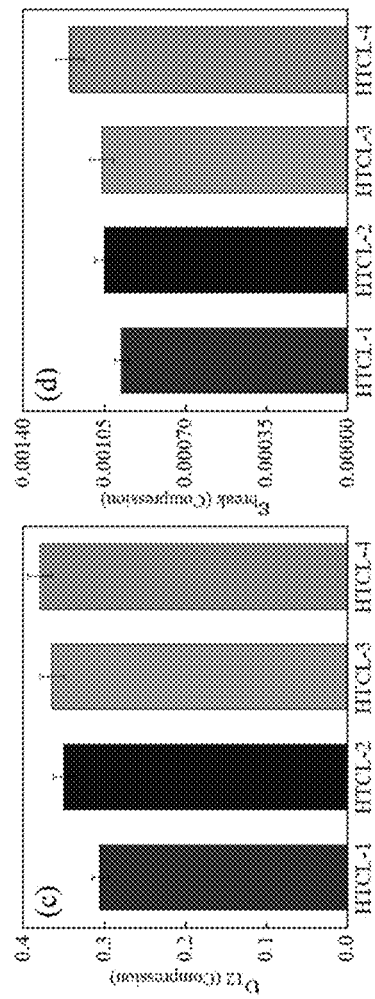
Figure 21D:
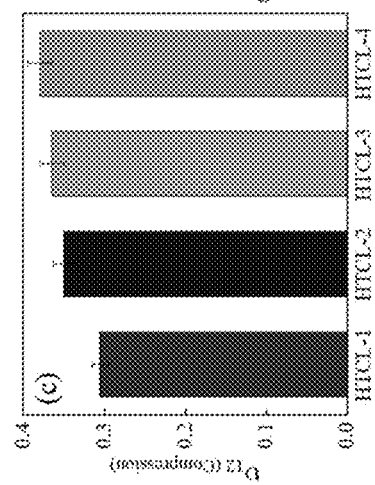

*Ti: 0.4 mm Titanium Alloy Sheet
Cf: Carbon Plain Weave fabric
PEf: UHMWPE Plain weave fabric FIGS. 21A-21D are the compressive properties of thermoplastic FML:
FIG. 21A shows the stress-strain curves, FIG. 21B is the modulus, FIG. 21C shows Poisson's ratios, and FIG. 21D shows ultimate strains.

FIGS. 22A-22D show the compressive failure mode of thermoplastic FML: FIG. 22A shows failure of HTCL-1, FIG. 22B shows failure of HTCL-2, FIG. 22C shows failure of HTCL-3, and FIG. 22D shows failure of HTCL-4.

Figure 23A:
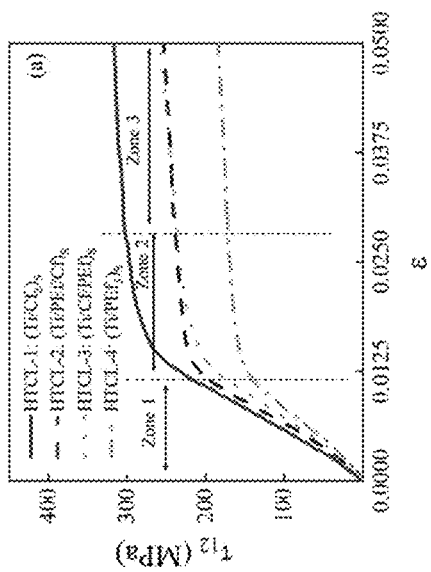
FIG. 23A-23C show the shear stress-strain of thermoplastic FML.
Figure 23C:
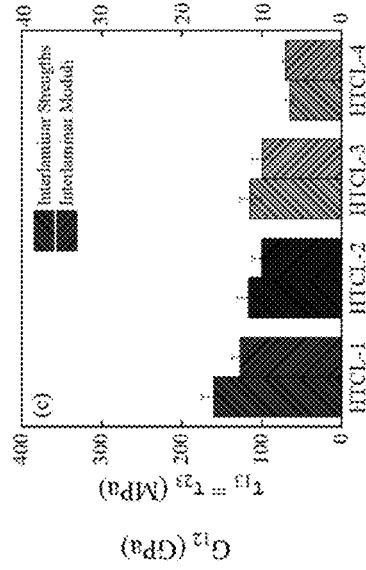
Figure 23B:
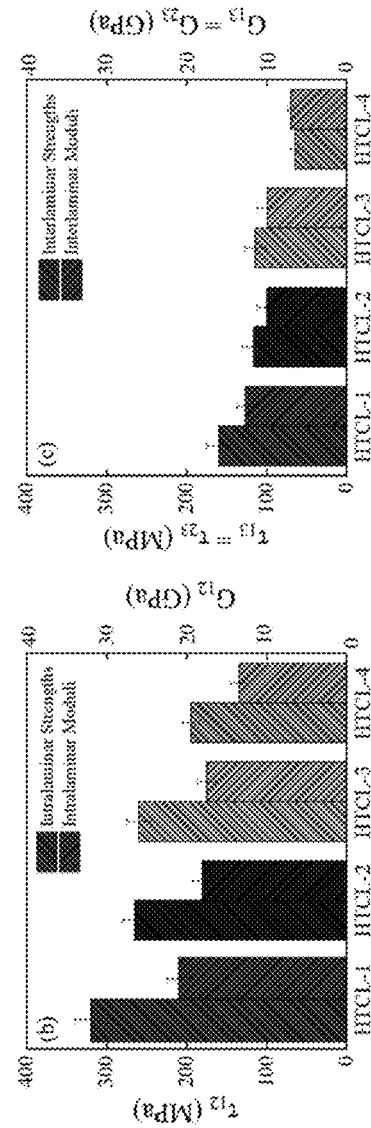

FIG. 23A-FIG. 23C show the shear stress-strain of thermoplastic FML: FIG. 23A is in-plane, FIG. 23B is out-of-plane, and FIG. 23C is ultimate shear.

FIG. 24A-FIG. 24D are the flexural properties of thermoplastic FML: FIG. 24A is stress-strain, FIG. 24B is the modulus, FIG. 24C is the ultimate strengths, and FIG. 24D is the ultimate strains.

FIGS. 25A-25D is the force-time plot of both thermosetting and thermoplastic FRP composites impact at a different impact energy: FIG. 25A 15 J, FIG. 25B 20 J, FIG. 25C 27 J, and FIG. 25D 33 J.

Figure 26:
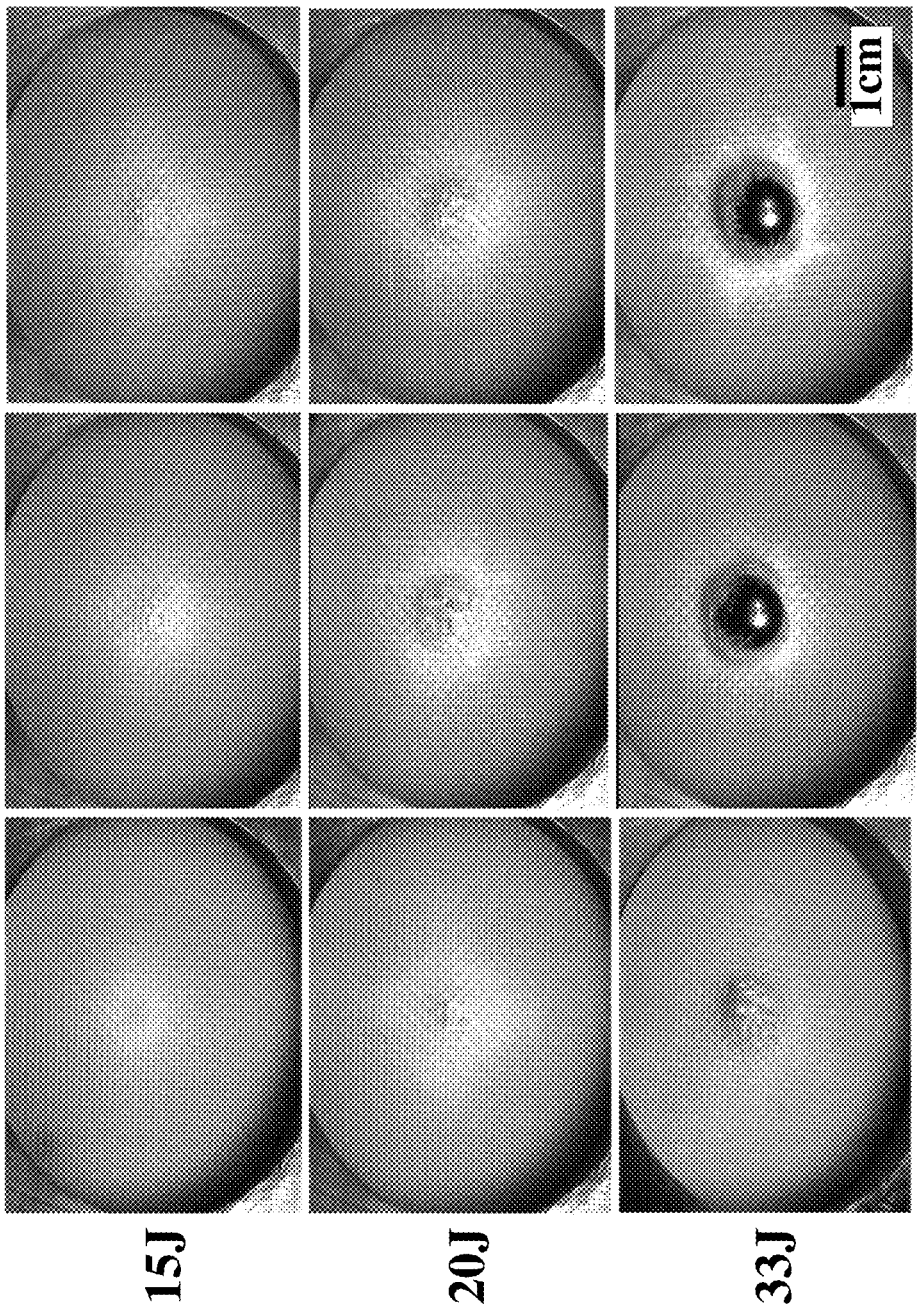
FIG. 26 are images of the non-impacted side of test specimens captured at 15 J, 20 J, and 33 J different impact energy of both thermosetting and thermoplastic FRP composites.

FIG. 26 are images of the non-impacted side of test specimens captured at 15 J, 20 J, and 33 J different impact energy of both thermosetting and thermoplastic FRP composites.

Figure 27:
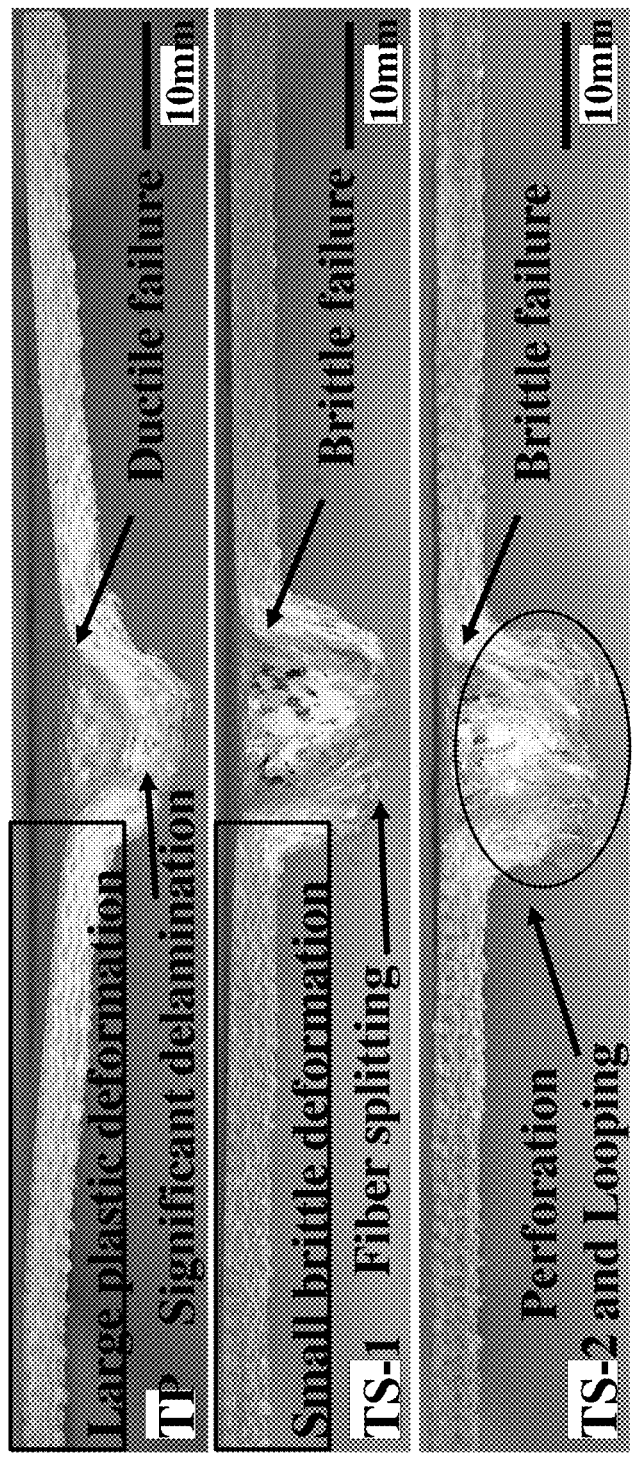
FIG. 27 shows cross-sectional images of both thermosetting and thermoplastic FRP composites impacted at 33 J of impact energy showing different failure modes.

FIG. 27 shows cross-sectional images of both thermosetting and thermoplastic FRP composites impacted at 33 J of impact energy showing different failure modes.

Figure 28B:
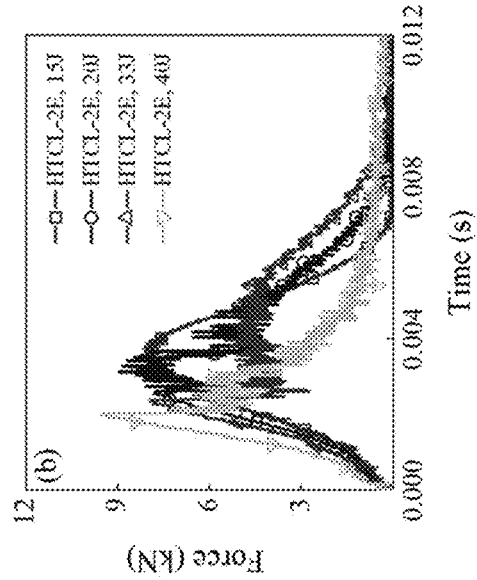
FIGS. 28A-28D are the force-time plots of thermoplastic FML composites impacted at different impact energies.
Figure 28D:
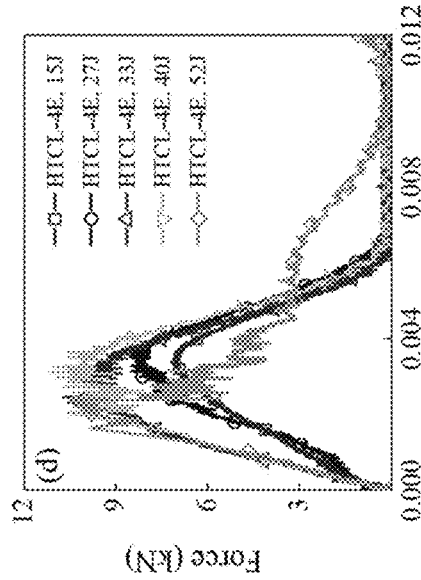
Figure 28A:
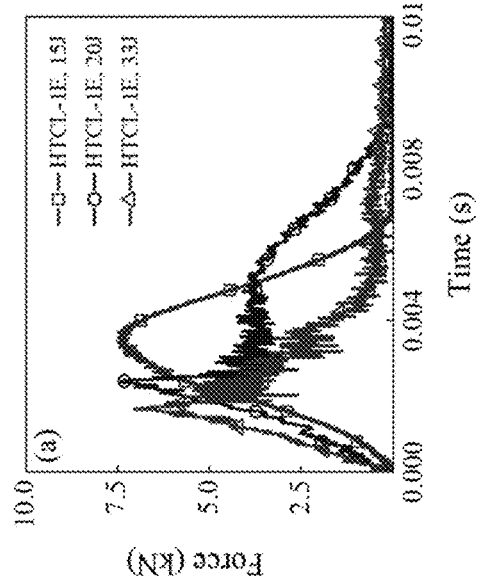
Figure 28C:
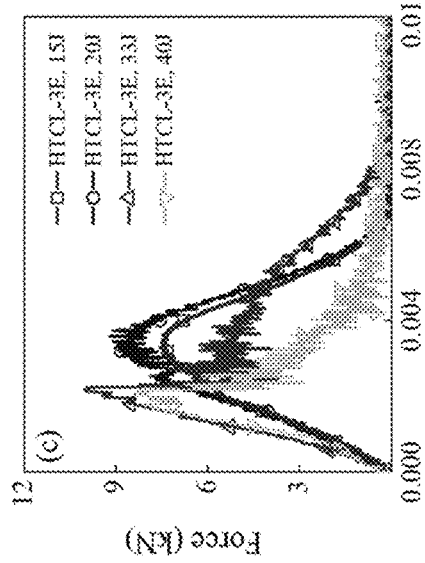

FIGS. 28A-28D are the force-time plots of thermoplastic FML composites impacted at different impact energies: FIG. 28A HTCL-1E, FIG. 28B HTCL-2E, FIG. 28C HTCL-3E, and FIG. 28D HTCL-4E.

Figure 29:
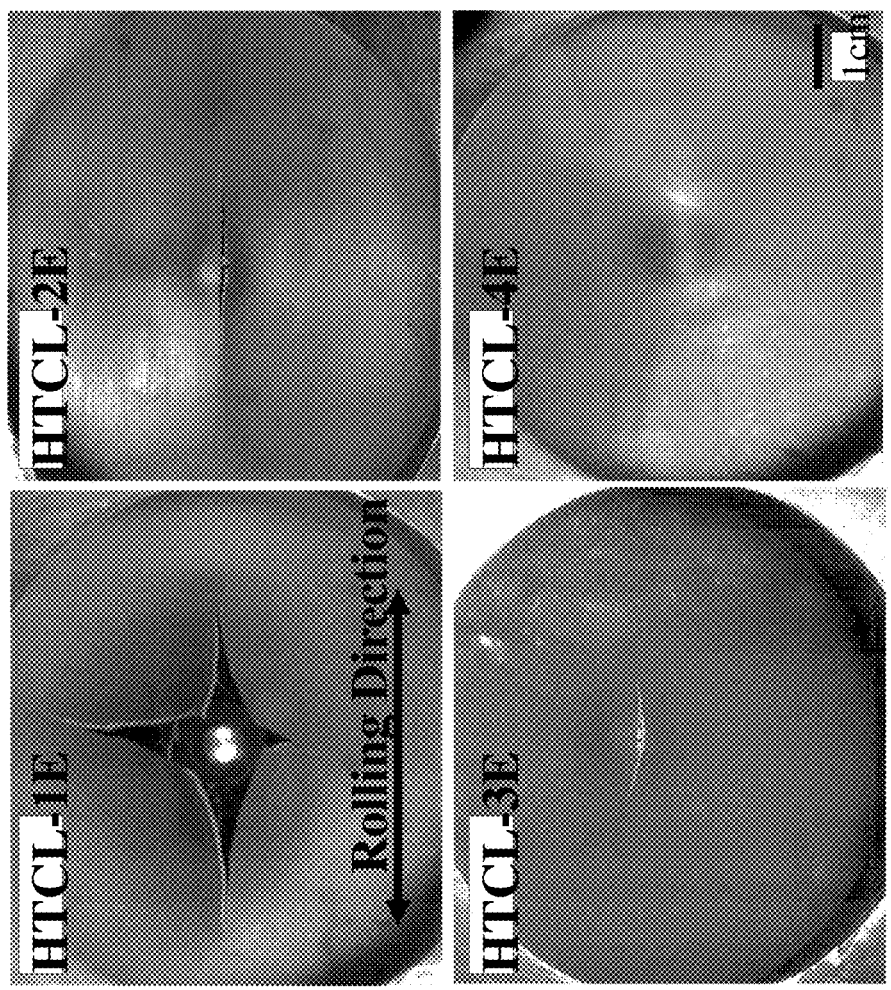
FIG. 29 shows images of the non-impacted side captured at a different impact energy for thermoplastic FML composites.

FIG. 29 shows images of the non-impacted side captured at a different impact energy for thermoplastic FML composites.

Figure 30:
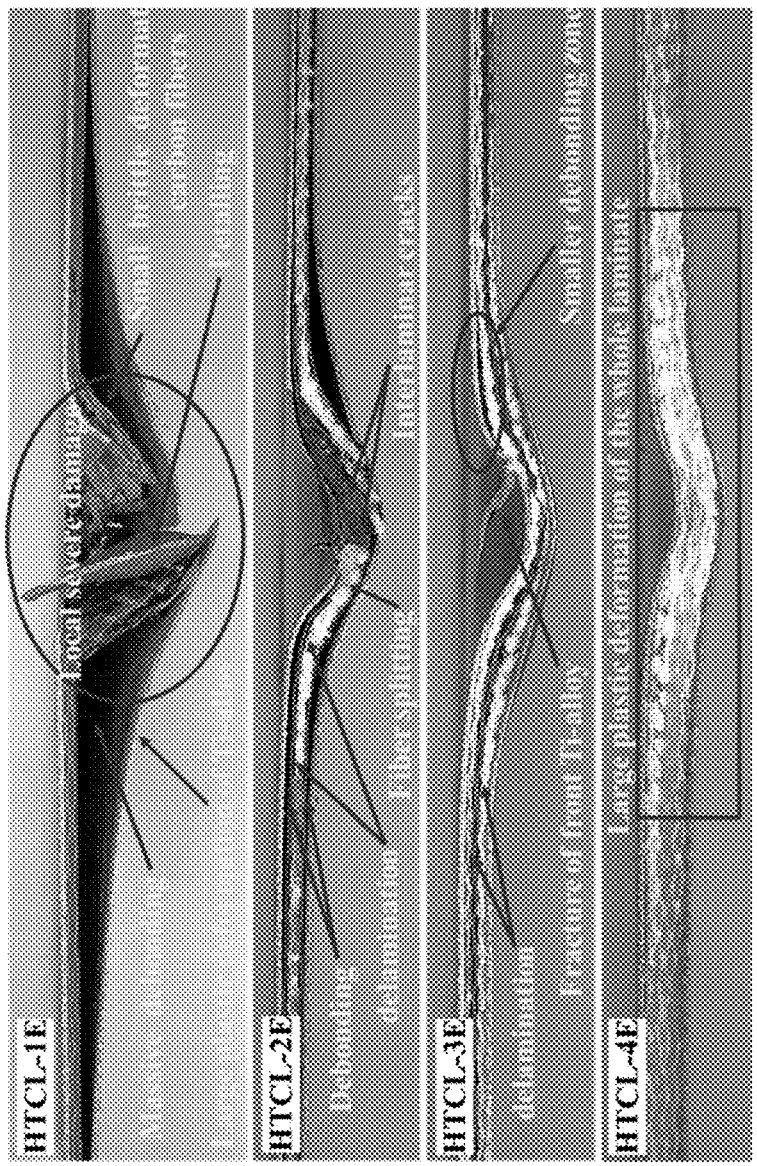
FIG. 30 shows cross-sectional images of thermoplastic FML composites impacted at 33 J of impact energy showing different failure modes.

FIG. 30 shows cross-sectional images of thermoplastic FML composites impacted at 33 J of impact energy showing different failure modes.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. An impact-resistant, lightweight, EMI-shielding electric vehicle battery enclosure comprising:
   a housing comprising a multiple-layer fiber-metal laminate including:
   at least one fiber-reinforced thermoplastic polymer composite layer formed by vacuum assisted resin injection;
   a first oleophilic electrochemically surface-roughened metal layer having a thickness from approximately 0.1 mm to 5 mm positioned on a first side of the at least one fiber-reinforced thermoplastic polymer composite layer, wherein the first oleophilic electrochemically surface-roughened metal layer has a liquid thermoplastic resin contact angle of approximately 20 degrees;
   a second oleophilic electrochemically surface-roughened metal layer having a thickness from approximately 0.1 mm to 5 mm positioned on a second side of the at least one fiber-reinforced thermoplastic polymer composite layer, wherein the second oleophilic electrochemically surface-roughened metal layer has a liquid thermoplastic resin contact angle of approximately 20 degrees;
   an insulating fiber-reinforced polymer composite positioned between the at least one fiber-reinforced thermoplastic polymer composite layer and either the first or second oleophilic surface-roughened metal layer;
   a layer of impact-absorbing foam selected from one or more of polyurethane, polystyrene, polypropylene, polyvinyl chloride, or polyethylene;
   wherein the housing includes reinforcing ribs;
   wherein the multiple-layer fiber-metal laminate has a stiffness-to-weight ratio of at least 30 $GPa/(g/cm^3)$; and
   a detachable cover positioned over the housing.

2. The impact-resistant, lightweight, EMI-shielding electric vehicle battery enclosure of claim 1, wherein the multiple-layer fiber-metal laminate further comprises an adhesive positioned between either the first or second oleophilic electrochemically surface-roughened metal layer and at least one fiber-reinforced thermoplastic polymer composite layer.

3. The impact-resistant, lightweight, EMI-shielding electric vehicle battery enclosure of claim 1, wherein the housing includes an interior void and the interior void includes an energy-absorbing or heat-absorbing material positioned therein.

4. The impact-resistant, lightweight, EMI-shielding electric vehicle battery enclosure of claim 3, wherein the interior void includes a heat-absorbing material comprising a phase-change material.

5. The impact-resistant, lightweight, EMI-shielding electric vehicle battery enclosure of claim 1, wherein the at least one fiber-reinforced thermoplastic polymer composite layer includes a polymer additive selected from one or more of milled carbon fiber, carbon nanotubes, metal or non-metal particles, or a microencapsulated phase change material.

6. The impact-resistant, lightweight, EMI-shielding electric vehicle battery enclosure of claim 1, wherein the first and second oleophilic electrochemically surface-roughened metal layers are each independently selected from titanium, magnesium, or aluminum, or alloys including titanium, magnesium, or aluminum.

7. The impact-resistant, lightweight, EMI-shielding electric vehicle battery enclosure of claim 1, wherein the housing further includes lifting lugs.

* * * * *